(12) United States Patent
Nystad et al.

(10) Patent No.: US 11,308,573 B2
(45) Date of Patent: Apr. 19, 2022

(54) MICROPROCESSOR SYSTEMS

(71) Applicant: ARM Norway AS, Trondheim (NO)

(72) Inventors: Jorn Nystad, Trondheim (NO); Edvard Sorgard, Trondheim (NO); Borgar Ljosland, Trondheim (NO); Mario Blazevic, Lena (NO)

(73) Assignee: ARM Norway AS, Trondheim (NO)

( * ) Notice: Subject to any disclaimer, the term of this patent is extended or adjusted under 35 U.S.C. 154(b) by 0 days.

(21) Appl. No.: 15/080,520

(22) Filed: Mar. 24, 2016

(65) Prior Publication Data
US 2016/0283408 A1 Sep. 29, 2016

Related U.S. Application Data

(60) Continuation of application No. 14/799,966, filed on Jul. 15, 2015, now Pat. No. 10,223,288, which is a (Continued)

(30) Foreign Application Priority Data

Jan. 22, 2003 (GB) .................................... 0301448

(51) Int. Cl.
*G06T 1/20* (2006.01)
*G06F 13/16* (2006.01)
*G06F 13/40* (2006.01)
*G06F 13/42* (2006.01)
*G06F 9/54* (2006.01)
*G06F 12/10* (2016.01)
*G06F 12/14* (2006.01)

(52) U.S. Cl.
CPC .................. *G06T 1/20* (2013.01); *G06F 9/54* (2013.01); *G06F 12/10* (2013.01); *G06F 13/1673* (2013.01); *G06F 13/4068* (2013.01); *G06F 13/4221* (2013.01); *G06F 12/1408* (2013.01); *G06F 2212/1052* (2013.01)

(58) Field of Classification Search
CPC ............... G06F 13/14–378; G06F 13/38–4295
USPC ......... 345/502, 504; 709/208–211, 230–237, 709/245; 713/189–194; 710/11, 105, 710/106, 315
See application file for complete search history.

(56) References Cited

U.S. PATENT DOCUMENTS 6,038,400 A * 3/2000 Bell .................... G06F 13/4291
326/37
7,055,038 B2 * 5/2006 Porter ................. G06F 12/1441
348/E5.108
(Continued)

OTHER PUBLICATIONS

Fraser, B. (1997), RFC 2196—Site Security Handbook, IETF, URL: https://tools.ietf.org/html/rfc2196 (Year: 1997).*
(Continued)

*Primary Examiner* — Diane M Wills
(74) *Attorney, Agent, or Firm* — Pramudji Law Group PLLC; Ari Pramudji

(57) ABSTRACT

A device includes a processor and memory. The memory has stored thereon a plurality of executable instructions. The executable instructions, when executed by the processor, cause the processor to: receive an access request affecting an operation of the device; facilitate encryption and/or authentication across an interface coupled to the device, wherein the interface is configured to secure the access request; and execute the access request.

23 Claims, 3 Drawing Sheets

Related U.S. Application Data continuation of application No. 13/655,483, filed on Oct. 19, 2012, now Pat. No. 10,331,574, which is a division of application No. 10/543,327, filed as application No. PCT/GB2004/000230 on Jan. 22, 2004, now Pat. No. 8,327,034.

(56) References Cited

U.S. PATENT DOCUMENTS

| | | | | |
|---|---|---|---|---|
| 2002/0116637 A1* | 8/2002 | Deitsch | G06F 21/305 | 726/12 |
| 2002/0161895 A1* | 10/2002 | Appiah | H04L 67/22 | 709/227 |
| 2003/0070083 A1* | 4/2003 | Nessler | G06F 21/602 | 713/193 |
| 2003/0105721 A1* | 6/2003 | Ginter | G06F 21/10 | 705/54 |
| 2003/0191799 A1* | 10/2003 | Araujo | H04L 63/0272 | 709/203 |
| 2003/0200448 A1* | 10/2003 | Foster | G06F 21/64 | 713/189 |
| 2003/0210248 A1* | 11/2003 | Wyatt | G06F 12/0888 | 345/541 |
| 2003/0210347 A1* | 11/2003 | Kondo | H04N 7/0145 | 348/383 |
| 2003/0229739 A1* | 12/2003 | Brewer | G06F 13/385 | 710/105 |
| 2004/0024890 A1* | 2/2004 | Baek | H04L 63/104 | 709/229 |
| 2004/0054757 A1* | 3/2004 | Ueda | H04L 67/04 | 709/219 |
| 2004/0081202 A1* | 4/2004 | Minami | H04L 12/2602 | 370/469 |

OTHER PUBLICATIONS

Kapadia, Nirav H., and José AB Fortes. "PUNCH: An architecture for Web-enabled wide-area network-computing." Cluster Computing 2.2 (1999): 153-164. (Year: 1999).*

* cited by examiner

MICROPROCESSOR SYSTEMS

This application is a Continuation of U.S. application Ser. No. 14/799,966, filed Jul. 15, 2015, which is a Continuation of U.S. application Ser. No. 13/655,483, filed Oct. 19, 2012, which is a Division of U.S. application Ser. No. 10/543,327, filed Mar. 10, 2006 (now U.S. Pat. No. 8,327,034), which is the US national phase of international application PCT/GB2004/000230, filed in English on 22 Jan. 2004, which designated the US. PCT/GB2004/000230 claims priority to GB Application No. 0301448.7 filed 22 Jan. 2003. The entire contents of these applications are incorporated herein by reference.

The present invention relates to microprocessor systems and in particular to such systems where a master device accesses (and thereby uses) resources on a slave device.

As is known in the art, it is common in microprocessor systems to provide resources for the system on a so-called "slave" device that can be accessed by functional units, such as a processing unit, on a controlling or "master" device of the system. Such a situation arises where, for example, a dedicated device providing specific functions or resources is added to a more general "host" microprocessor. In this case the "host" microprocessor will act as a "master" accessing "slave" resources on the "guest" dedicated device. An example of such an arrangement would be where a dedicated 3D graphics processing platform, for example in the form of a graphics "card", is added to a "host" personal computer (PC) system. Other known master and slave arrangements include other add-in cards for computer systems, such as network interface cards.

In such a master and slave system, the master and slave devices will communicate with each other via a communications bus connected between them. Typically, communication from a master device to a slave device will involve either a read request or a write request. A read request will basically comprise the address of the slave resource whose value the master device wishes to read (as is known in the art, each resource on the slave device will typically be allocated an "address" on the communications bus that the master device can use to access the resource on the slave device) and the (expected) response from the slave device will be the return of the value of the slave resource. A write request comprises the address of the slave resource to which a value in the write request is to be written, together with the value to be written to that slave resource.

The master device will typically communicate with and control the slave device by means of a software "driver" that runs on the master device and is configured to communicate with and control the specific hardware of the particular slave device. (Software) applications running on the master device and requiring resources on the slave device will interface and communicate with the software driver on the master device via an appropriate API (Application Programming Interface). The slave device driver on the master device will recognise and respond to the standard API commands that the application requiring the slave device's resources produces and translate them into instructions tailored to the particular slave device (hardware) in question.

(As is known in the art, it is usual to use standardised APIs (Application Programming Interfaces) for interfacing and communication between software applications and, e.g., hardware drivers, as that avoids software applications needing to be configured for specific hardware arrangements. Thus a given API will allow an application requiring certain slave resources to send standardised commands to an appropriate slave device hardware driver, without the application needing to know the specific hardware of the slave device in the system.)

As discussed above, a 3D graphics enabled computer system is an example of a master and slave arrangement and typically will comprise a master "host" general microprocessor and a slave dedicated 3D graphics processing platform (typically mounted on a so-called "graphics card"). In such a system, (software) applications (including applications that require 3D graphics) are executed on the host microprocessor, but whenever 3D graphics operations are to be performed, the host microprocessor instructs the 3D graphics processor to carry out at least some of those 3D graphics operations.

In a typical 3D graphics system arrangement, the 3D graphics processing platform driver on the host processor is arranged to receive 3D graphics API commands from an application running on the host processor about graphics to be drawn, to generate appropriate graphics data to draw the desired images and to then send that graphics data to the 3D graphics processing platform together with appropriate commands to tell the 3D graphics processing platform how to process the 3D graphics data. The 3D graphics processing platform then carries out various graphics processing operations on the data it receives, such as rasterising and rendering it (and in some cases transformation, lighting, etc., operations as well). (The exact division of the 3D graphics operations between the host processor and the graphics processing platform can vary, but generally speaking the host processor will at least generate the initial graphics data, and the graphics processing platform will carry out at least the rasterisation and rendering steps.)

FIG. 1 shows schematically a typical host processor and dedicated 3D graphics processing platform arrangement, and some of the functions of the 3D graphics driver on the host processor. As shown in FIG. 1, the host processor 10 executes, inter alia, an application 11 that requires the display of 3D graphics, and a 3D graphics driver 12 that recognises (API) calls for 3D graphics from the 3D-graphics requiring application 11 and processes those calls to provide relevant graphics data and commands via a bus 13 to the dedicated 3D graphics processing platform (accelerator) 14.

To be able to use the resources of a slave device, the master device must be able to access the slave device's resources properly via the interface the slave device presents to the communications bus linking it to the master device. The master device must therefore know the "interface" that the slave device presents to the communications bus.

To facilitate this, many slave device drivers are dedicated and tailored for (and therefore know) the specific interface that the corresponding slave device (e.g. 3D graphics processing platform) presents to a communications bus. However, a disadvantage of such systems is that because the master device executes a dedicated hardware driver to communicate with and access the slave device, then such systems can be relatively inflexible. For example, if it is desired to change the slave device or to add a new slave device to the system, then normally a new hardware driver on the master device would be required as well (because the new slave device will present a different interface to the communications bus). That may not always be desirable or possible.

One aspect of the interface that a slave device presents to a communications bus (and thereby to a master device accessing the slave via the communications bus) is the bus addresses that must be used by the master device to access the resources on the slave device. As is known in the art, each resource on the slave device will have a "true", physical internal address that must at least be used internally on the slave device to allow that resource to be accessed. Thus, the master device could simply use the true, physical internal addresses of the slave's resources to access those resources. However, such an approach means there is no flexibility in the addresses that the master device can use.

It is known therefore in certain master and bus slave arrangements to allow a master device to access slave resources using a so-called "virtual address" that is then translated on the master device to the true internal address of the resource on the slave device to allow the slave resource to be accessed. In effect, external, "virtual" addresses that can be used by a master device are mapped to the fixed, internal addresses that represent the "true" physical addresses of the slave's resources. This allows the creation of abstraction between the address used to access a slave resource by a master device and the physical slave resource and some flexibility in the interface operation between the master and slave. For example, when using "virtual" addressing, the address that must be used by a master device to access a slave resource can simply be altered by altering the mapping relationship between the "virtual" addresses used by the master device and the slave's "true" internal resource addresses.

Such virtual addressing address translation and mapping is typically carried out by a so-called "memory management unit" (MMU) on the master device, as is known in the art. Such a memory management unit typically accepts access requests for slave device resources with virtual addresses, translates the virtual addresses to the corresponding slave physical addresses and forwards the access requests to the corresponding physical slave resources.

Such virtual addressing arrangements can assign each virtual address completely independently of the mapping of any other addressable elements (so-called full arbitrary address mapping). However, it is more common to use coarser-grained address mapping, in which the slave resources' physical addresses are arranged in equally-sized groups or "pages". This reduces the flexibility of the address mapping process, but reduces the amount of address mappings that have to be stored and implemented. In such an arrangement the address mapping "page" to which a given virtual address is mapped can be changed, but to facilitate distinguishing between the physical addresses grouped on each page, the address position on each page indicated by a given virtual address (i.e. whether it maps to the 1st, 5th, 10th, etc., address on the "page") is usually constrained to remain the same for all address mapping pages.

Thus, for example, in such an arrangement having an address space of 40 addressable elements (i.e. 40 physical addresses), and a page size of 10 addressable elements (thereby providing physical address groups 0 to 9, 10 to 19, 20 to 29 and 30 to 39 (in a decimal (base 10) number system—of course in practice the computer system would use a binary number system for the addressing), a given virtual address such as 15 could be mapped to any of the address pages, but would map to the same address position on each individual address page. Thus the virtual address 15 could be mapped, for example, to any of the physical addresses 05, 15, 25 or 35 (on pages 1, 2, 3 and 4, respectively), but not to, e.g., 05, 17, 26, 38, or 05, 06, 07, 08. Thus the page address (1) can be mapped to any available page, but the page index (5) is constrained to be the same on each page (and, in this example, in both the virtual and physical address).

Although mapping addresses in pages in this manner reduces the address mapping information that must be stored and implemented, there can still be a significant number of mappings of address pages that need to be stored and this usually results in an address mapping table that is too large to store in a memory that is local to, and quickly accessible by the memory management unit. The complete address mapping table is therefore usually stored in the master device's main memory, with only a small subset of the address mappings being stored in a local memory that is more quickly accessible by the memory management unit. This "local" memory and its associated logic is usually called a "Table Lookaside Buffer" (TLB).

The operation of this type of memory management arrangement is usually carried out under the control of a processing unit on the master device. When the memory management unit can't find the address mapping for a given virtual address in the Table Lookaside Buffer, or the Table Lookaside Buffer entry is invalid for some reason, it will be unable to translate the virtual address, and so signals the controlling processor of that fact so the appropriate action can be taken. This signal to the controlling processor of an "address miss" (i.e. an address that cannot be mapped using the Table Lookaside Buffer) is often called a "TLB miss" if the address is not in the Table Lookaside Buffer and a "pagemiss" if the entry is marked as invalid (i.e. has previously been validly mapped (and so has an entry in the mapping table) but is no longer valid) or completely missing. In response to such a signal, the controlling processor would normally solve the problem either by loading the appropriate mapping of an address page from the main memory to the Table Lookaside Buffer (e.g. where the virtual address has already been mapped but the mapping of the relevant address page is not currently stored in the Table Lookaside Buffer—a TLB miss), or by preparing an appropriate new mapping of an address page (by mapping a slave resource to the address that caused the "miss" (which would be done by the master device based on knowledge of the slave's resources—which it should know), updating the page table and loading the new mapping of an address page into the Table Lookaside Buffer (e.g. where the virtual address had not previously been mapped to a physical address—a page miss). This allows address mapping errors or the use of virtual addresses that have not previously been mapped to be corrected and compensated for.

It will be appreciated that in such address mapping arrangements, where an address miss occurs, although the correct address mapping is then determined, the original access request that led to the address miss would not have been properly carried out. In normal master device arrangements where the master device is a CPU (central processing unit) based platform that includes a memory management unit and uses such virtual addressing arrangements, this problem is solved by the master device's CPU simply repeating (restarting) the request that led to the address miss, once the address miss has been resolved (e.g. by mapping the address). This is possible because it will be the master device's own applications that generate the address misses from the memory management unit. Thus the master device's CPU will know that an address miss has occurred and which application caused the miss, and so it can easily restart the offending instruction in the application to continue the execution and the access.

However, the Applicants have recognised that a drawback with such systems is that address misses can only properly be resolved where the original access request that caused the address miss can be restarted and repeated, i.e. where the access request originating application is running on or under the control of a processing unit that also gets signalled that an address miss has occurred. If the processing unit that identifies and resolves the address miss cannot reliably have the access request originator restart the failed access request, then the original request may simply have to fail and may therefore never be properly executed. This means that it has not generally been possible to provide (full) virtual addressing and address translation functions on slave devices themselves, because the slave device would normally have no way of signalling the master device to restart the access request that caused the address miss, particularly where the master device is external to the slave device.

Thus, the Applicants believe that there remains scope for improvement of master and bus slave arrangements.

Thus, according to a first aspect of the present invention, there is provided a slave device for use in a microprocessor system, comprising:

means for coupling the slave device to a communications bus via which bus resources of the slave device may be accessed by a master device addressing those resources via the bus;

means for attempting to identify from the address used by a master device in an access request the slave resource to which the access request applies;

means for identifying when the means for attempting to identify the slave resource to which an access request applies cannot identify the slave resource to which the access request applies; and means for, when such an access request is identified, and the request by the master device is a write request, storing on the slave device the address used in the write request and the value in the write request that is to be written to the addressed resource.

According to a second aspect of the present invention there is provided a method of operating a slave device for use in a microprocessor system, which slave device can be coupled to a communications bus via which bus resources of the slave device may be accessed by a master device addressing those resources via the bus, and comprises means for attempting to identify from the address used by a master device in an access request the slave resource to which the access request applies; the method comprising:

identifying when the means for attempting to identify the slave resource to which an access request applies cannot identify the slave resource to which the access request applies; and when such an access request is identified, and the request by the master device is a write request, storing on the slave device the address used in the write request and the value in the write request that is to be written to the addressed resource.

The present invention provides a slave device for providing resources to a master device that can identify when an address used by a master device cannot be matched to a slave resource, i.e. when an address miss occurs. However, unlike in conventional virtual addressing and memory management units, when such an address miss arises in the case of a write request, the slave device of the present invention also stores the value to be written to the slave resource that is included in the write request. This means that the slave device itself has all the information it needs to respond to the write request once the address miss is resolved without the need to revert to the originator of the write request (i.e. the master device) (e.g. to ask it to resend the write request). In this way the slave device of the present invention can respond to the write request that caused the address miss even where the slave device that identifies the address miss has no control over or communication with the request originator. This facilitates, inter alia, the use of virtual addressing and memory management units on slave devices even where the slave may not have any control over the master's operation or appropriate communication back to the master (e.g., to command it to restart an access request).

When the slave device recognises that an address miss has occurred on a write request from a master device, it should store all the data in the write request necessary to allow the request to be handled after the address miss is resolved without the need to involve the request originating master device. It should therefore store at least the resource address used in the write request and the value the master wants to write to the addressed resource. However, if other information sent as part of the write request would be needed to respond to it, then that information should be stored by the slave device as well.

The data and values for responding to a write request that causes an address miss are preferably stored in an appropriate local memory on the slave device. Most preferably a write buffer memory is provided for this purpose. The storage location, e.g., buffer, size should be sufficient to accommodate a complete write transaction (which size will be determined, as is known in the art, by the communications bus protocol via which the requests and responses are sent between the master and slave device (and therefore known)).

The way that the slave resource to which an address in a request from a master device relates is identified can be selected as desired. The identification could also involve different forms of enable signals (which can be viewed as address extensions). Preferably the slave device stores, preferably predefined, relationships between addresses to be used by a master device to access resources on the slave device and internal addresses for those resources on the slave device, so that it can then match (map or translate) the address used by the master device to the internal address of one of its resources (as would be the case in conventional virtual addressing techniques). (Indeed, as discussed above, a key advantage of the present invention is that it facilitates the provision of address translation functions on the slave rather than those functions having to be carried out on the master.) The predetermined address relationships are preferably stored in (at least) two locations, with a subset of the overall address mapping table stored in a more quickly accessible memory (e.g. a table lookaside buffer) which is preferably on the slave device and the full address mapping table stored in another memory accessible to the slave device. These memories are preferably located on the slave device but could also be outside of the slave device (particularly in the case of the full address table memory) where, for example, the slave can access and use "off-slave" memory.

In such an arrangement, identifying an address miss would then comprise identifying an address used by a master device when attempting to access a resource on the slave device for which no predetermined relationship with an internal address on the slave device is stored (in at least one but possibly all of the address relationship stores on the slave device). Where the address relationships are stored in two locations, then preferably if an address relationship for the address used by the master device is not stored in the more quickly accessible memory that stores the subset of the full address mapping table (i.e. in the table lookaside buffer where provided (in which case this address miss would be a "TLB miss")), that is treated as an address miss and identified as such, even if an address relationship for the address used by the master device is stored in the full address mapping table.

Once an address miss has occurred and been identified, it needs to be resolved so that the write request can proceed. This can be done in any suitable manner. Thus, for example, where slave resources are identified by relating the addresses used by master devices to internal resource addresses of the slave device, the slave device could determine such a relationship for the missed address (i.e. determine an internal resource address to which the address used by the master device should apply) and store it in the relevant address relationship store to then be used to process the write request. Where, for example, address mapping tables storing predetermined relationships between addresses to be used by master device and internal addresses of slave resources are stored in two locations, and an address relationship entry for the address used by the master is not stored in the local address mapping store, but is stored in the full address mapping store, this could be done by the slave device simply loading the relevant address mapping entry from the full address mapping store to the local address mapping store to allow it to then map the address used by the master device.

Alternatively, where an address relationship for the address used by the master device is not stored anywhere on the slave device, then the slave device could determine a relationship (and corresponding mapping of an address page) for the missed address to a slave resource and then store the determined relationship between the address used by the master device and the slave resource (the determined address page mapping) in the address relationship table, which stored address relationship can then be used by the slave device to allow it to map the address used by the master device.

In both these cases, once the new address relationship is appropriately stored, the slave device can then restart the write request using the stored address relationship and the stored write request value, etc., to allow the request to be carried out. This would be similar to the existing process in known memory management units where missed addresses are mapped and then the request originator restarts its access request, except that in the present invention the access request is effectively restarted and carried out by the slave device without involving the originating master device at all. Of course, in these arrangements, once the address causing the address miss has been mapped to an internal address of the slave device and its mapping stored, subsequent use of that address will no longer cause an address miss (at least where it is stored in the more local, more quickly accessible address mapping store).

The slave device can preferably also or instead resolve an address miss without the need to access stored address relationship tables and/or to store a new address relationship so that it is available for future access requests. This could be done, e.g., by the slave device determining the resource to which the address relates and writing the write value (using the stored information relating to the write request) to that resource but without further storing the determined address relationship in, e.g., an address mapping table for future use.

As will be appreciated by those skilled in the art, in such an arrangement, an address relationship (e.g. mapping of an address page) for the address used by the master device that caused the address miss will not be stored by the slave device for future use, and therefore subsequent use of the address that caused the address miss by the master device will cause another address miss (i.e. a new address miss will occur the next time the address is requested). This means that each time the address causing the address miss is used by a master device, the slave device will have to resolve the address miss anew, i.e. in effect on a "per access" basis. However, such an arrangement may have advantages because it can, e.g., allow the access to be handled differently at different times, and allows the access to be handled without the need to involve, e.g., address relationship stores (that may not be so quickly accessible in use). Indeed an advantage of the present invention is that it allows write requests from a master device to be handled on a "per access" basis.

As discussed above, the other form of access that a master device will typically make to a slave device is a read request. Again the slave device of the present invention preferably identifies when a read request causes an address miss and responds accordingly (preferably in the same manner or manners as discussed above in relation to write requests). Where the address miss is resolved by retrieving an address relationship from an address relationship store or by determining a new internal address relationship for the missed address and storing it in an address relationship store, then all the slave device needs to store to allow the read request to be restarted and properly completed is the address in the original read request.

However, the Applicants have recognised that in some circumstances it may be desirable to handle missed read requests on a "per access" basis as well. Thus, in a particularly preferred embodiment, the slave device also includes means for returning a value in response to a read request that caused an address miss without the need to access a (permanent) address relationship store (to, e.g., either store a new determined address relationship or access an existing one). This could be done, e.g., by the slave device determining the resource the read request is intended for, reading the value of that resource, storing that read value, and then returning it to the requesting master device at an appropriate time. The read value could be returned to the request originator, e.g., either on a signal from a controlling unit of the slave device, or automatically when a predetermined amount of "read value" data has been stored.

It is believed that such an arrangement may be new and advantageous in its own right. Thus, according to a third aspect of the present invention, there is provided a slave device for use in a microprocessor system, comprising:

means for coupling the slave device to a communications bus via which bus resources of the slave device may be accessed by a master device addressing those resources via the bus;

means for attempting to identify from the address used by a master device in an access request the slave resource to which the access request applies;

means for identifying when the means for attempting to identify the slave resource to which an access request applies cannot identify the slave resource to which the access request applies; and means for, when such an access request is identified, and the request by the master device is a read request, generating a response to the read request for returning to the master device without storing for use with future accesses by a master device the identity of a slave resource to which the address used by the master device in the read request has been related.

According to a fourth aspect of the present invention there is provided a method of operating a slave device for use in a microprocessor system, which slave device can be coupled to a communications bus via which bus resources of the slave device may be accessed by a master device addressing those resources via the bus, and comprises means for attempting to identify from the address used by a master device in an access request the slave resource to which the access request applies; the method comprising:

identifying when the means for attempting to identify the slave resource to which an access request applies cannot identify the slave resource to which the access request applies; and when such an access request is identified, and the request by the master device is a read request, generating a response to the read request for returning to the master device without storing for use with future accesses by a master device the identity of a slave resource to which the address used by the master device in the read request has been related.

As discussed above, preferably these aspects of the invention include means for or steps of storing on the slave device the address used in the read request and the value that is to be returned to the master device in response to the read request, as that facilitates such "per access" responding to read requests that cause address misses.

Where read request values are to be stored on the slave device, they are preferably stored in an appropriate local memory, preferably a read buffer memory, on the slave device, as for write request values. The storage location, e.g., buffer, size should again be sufficient to accommodate a complete read transaction (which size will again be determined by the communications bus protocol via which the requests and responses are sent between the master and slave device).

As well as storing the kind of data discussed above to allow write and read requests to proceed when an address miss occurs without the need to involve the request originator, it may be necessary for the slave device to store other information to allow a proper response to the access request. This information could include, for example, "request" data that must be extracted from an access request to allow the slave device to give a proper response to the access request, and/or "response" data that is prepared by the slave device itself to allow a proper response to the master device to be provided.

For example, it may be necessary to store whether the request that generated an address miss was a read request or write request if that is not otherwise readily apparent. Alternatively or additionally, where the communications bus communications protocol permits, e.g., multiple read (or write) requests and out of order replies, the slave device may need to store information to allow it to include appropriate request markers or tags with its replies to allow the master device to distinguish between replies and match them to the appropriate requests.

This additional data and information is preferably stored in a suitable local memory, e.g., buffer, of the slave device. This could be the write buffer discussed above (where, for example, the data is "request" data extracted from the request), the read buffer discussed above (where, for example, the data is "response" data generated by the slave device), or a separate buffer provided for this additional information. As will be appreciated by those skilled in the art, the various, e.g., buffer, memories can be arranged as desired, e.g. as distinct memory devices or as different locations in the same memory device.

The way that the slave device handles an address miss on a "per access" basis (i.e. when it doesn't or cannot resolve the address miss by loading an address relationship for the address that caused the address miss into an appropriate address relationship store (e.g. a table lookaside buffer, if provided)) can be selected as desired.

For example, where the slave device has a physical resource appropriate to the access request that caused the address miss, the slave device could determine a slave resource to which the access request causing the address miss should be applied, forward the request to the determined resource and process the request, e.g. by writing the value in the access request to the determined resource (where the access request is a write request) or reading the value of the determined resource (where the access request is a read request), and then return an appropriate response to the requesting device (e.g. the value read from the determined resource for a read request). These operations (the processing in response to the access request) are preferably carried out under software control on the slave device (although it will be appreciated that in this type of arrangement, (at least some of) the actual processing in response to the access request will still be carried out by a physical slave resource). The slave device preferably therefore includes a controlling processor or processors that execute a program or programs for this purpose.

It will be appreciated that the above operation somewhat duplicates the operation that would be required when resolving an address miss by first storing an address relationship to a slave resource for the missed address. However, it may be preferable to still resolve accesses in this way on a "per access" basis even where the slave device has the requested (or a compatible) resource, for example if the address causing the address miss does not map well in the address mapping structure used on the slave device (because, e.g., the address mapping structure does not allow the needed mapping).

In a particularly preferred embodiment, the slave device of the present invention is also (or instead) able to handle and respond to an access request without the need to determine and access a physical resource on the slave device. This allows the slave device to handle access requests that cause address misses on a "per access" basis even where the slave device does not have an appropriate physical (hardware) resource. Preferably the access request (and any response thereto) in these circumstances is processed and acted upon using software running on the slave device and most preferably handled entirely in software.

Thus, the slave device preferably includes means for handling accesses from a master device using software. Preferably such means process, and/or generate a response to, the access in software. Such means preferably comprise an internal program running on a processing unit or units of the slave device. The way that the software handles and processes the access can be selected as desired and will be determined, e.g., by the programs loaded on the slave device for this purpose. Preferably the slave device runs a program to interpret the access attempt and then generate an appropriate response thereto. For example, for a read access, the slave device could run a program that will return the appropriate data to the accessing unit. This is preferably done by the software writing that data to a read buffer (as discussed above) from which it can be sent to the accessing master device. Similarly, for a write access, the slave device preferably runs a program that will retrieve the data value to be written sent by the accessing unit from its storage location on the slave device (e.g. a write buffer as discussed above) and store or use that value appropriately.

In these arrangements the slave device (software) can and should use whatever resources are available to it to create and/or emulate the response the accessing device expects.

Such resources are preferably located on the slave device, but may also be "off-slave" resources that the slave device can access, where appropriate. The slave device is preferably arranged to provide responses that conform to the interface communications protocol via which the slave and master communicate (as will be appreciated by those skilled in the art, communications between the master and slave devices will always follow a (known) predefined protocol, which can therefore be known to the slave device so that it can be arranged to generate responses that conform to that protocol). The exact format, etc., of the responses to be generated by the slave will, as will be appreciated by those skilled in the art, vary depending on the communications protocol and the slave resources available.

It is believed that this arrangement may be new and advantageous in its own right. Thus, according to a fifth aspect of the present invention, there is provided a slave device for a microprocessor system, comprising:

means for coupling the slave device to a communications bus via which bus resources of the slave device may be accessed by a master device;

means for handling in software an access received from a master device;

means for receiving an access signal for the slave device from a master device; and means for determining whether to pass the access to a resource of the slave device, or to pass the access to the means for handling an access in software.

According to a sixth aspect of the present invention, there is provided a method of operating a slave device for a microprocessor system, which slave device comprises means for coupling the slave device to a communications bus via which bus resources of the slave device may be accessed by a master device, the method comprising:

the slave device receiving an access signal for the slave device from a master device; and determining whether to pass the access to a resource of the slave device or to handle the access in software.

While the slave device will in its preferred embodiments at least generate responses to accesses on a "per access" basis for which it finds it does not have an appropriate physical resource mapping, in a particularly preferred embodiment, the slave device is arranged to handle particular, expected access requests on a "per access" basis, even where it might be possible to set up an appropriate address mapping. This may be advantageous to, e.g., provide the slave device with greater flexibility and control over the interface it presents to a master device.

For example, where address mapping as discussed above is used, then no internal address mapping could be set for those access addresses that it is known will be (or are desired to be) handled on a "per access" basis, e.g. addresses that will be used by a master device to access resources that the slave device does not have in hardware. In this way, when a master device attempts to access such a resource, no corresponding internal address will be found by the mapping process and the slave device can then recognise that and respond to the access on a "per access" basis, e.g., by generating a response in software instead. Thus in a particularly preferred embodiment some addresses expected to be used by a master device to access the slave device will not be mapped to a corresponding internal address.

The slave device could also when it first handles an access request that caused an address miss on a "per access" basis, decide to leave the address unmapped (even where it would be possible to determine and store an address relationship for the address that caused the address miss), to thereby ensure that that access address will always trigger an address miss and therefore be handled on a per access basis.

It is believed that these arrangements may be new and advantageous in their own right. Thus, according to a seventh aspect of the present invention, there is provided a slave device for a microprocessor system, comprising:

means for coupling the slave device to a communications bus via which bus resources of the slave device may be accessed by a master device by addressing those resources via the bus;

means for associating addresses expected to be used by a master device to access resources on the slave device with internal addresses for those resources for use by the slave device, wherein one or more of the addresses expected to be used by a master device are not associated with an internal address.

According to an eighth aspect of the present invention, there is provided a method of configuring a slave device for a microprocessor system, which slave device comprises means for coupling the slave device to a communications bus via which bus resources of the slave device may be accessed by a master device by addressing those resources via the bus; the method comprising:

associating addresses expected to be used by a master device to access resources on the slave device with internal addresses for those resources for use by the slave device, wherein one or more of the addresses expected to be used by a master device are not associated with an internal address.

It is also believed that the provision of "per access" responding to address misses in the context of virtual addressing arrangements may be new and advantageous in its own right. Thus, according to a ninth aspect of the present invention, there is provided a slave device for use with a microprocessor system, comprising:

means for coupling the slave device to a communications bus via which bus resources of the slave device may be accessed by a master device addressing those resources via the bus;

means for converting addresses used by a master device to access resources of the slave device to internal addresses to be used for those resources by the slave device; and means for responding to an access request from a master device without using the means for converting addresses to convert the address used by the master device to an internal address of the slave device.

According to a tenth aspect of the present invention, there is provided a method of operating a slave device for use with a microprocessor system, the slave device comprising means for coupling the slave device to a communications bus via which bus resources of the slave device may be accessed by a master device addressing those resources via the bus; and means for converting addresses used by a master device to access resources of the slave device to internal addresses to be used for those resources by the slave device; the method comprising:

the slave device responding to an access request from a master device without using the means for converting addresses to convert the address used by the master device to an internal address of the slave device.

It will be appreciated from the above that in certain embodiments at least, the slave device will need to determine a resource to which an access applies where it does not already, for example, store an appropriate association between the address used by a master device and a slave resource. This could be, for example, to allow the slave device to then prepare and store an address mapping for the address concerned, or to allow the slave device to respond to the access request on a per access basis.

The way that the slave device determines the resource to which the access should be applied in these circumstances can be selected as desired. Preferably the slave device includes a processing unit that carries out the resource determination, preferably by means of the operating system running on the processing unit determining the correct resource.

To facilitate this, the slave device, e.g. processing unit, preferably knows of all the resources on the slave device and preferably can, if necessary, analyse the access request or requests to determine the resource required. Such functionality can be provided by appropriate programming of the slave device (e.g. of a controlling processor on the slave device). This is possible because, for example, a programmer of the slave device will have knowledge of the resources available on the slave device or platform and of the accesses the slave device might be expected to receive.

In such an arrangement, the slave device could, e.g., be programmed to statically associate different accesses to slave resources, and/or to map accesses to resources in a more dynamic, "smarter" fashion. For example, a more straightforward "map and forget" type arrangement might be suitable where the access or accesses fit well with the slave's resources. On the other hand, if the slave's resources are dynamic (pluggable), the slave device may need to first identify the resources available at that time (and would need to be, e.g., provided with suitable means or an arrangement for such resource detection) and have a more dynamic management system for servicing accesses. More complex and dynamic management of the resources and mappings may also be desirable where there is the possibility of load and functionality sharing or balancing between the slave and master devices.

As discussed above, an important advantage of the present invention is that it facilitates the use of address translation functions on the slave device itself, rather than those functions having to be carried out on the master device. Indeed, it is believed that this may be new and advantageous in its own right. Thus, according to an eleventh aspect of the present invention, there is provided a slave device for use in a microprocessor system, comprising:

means for coupling the slave device to a communications bus via which bus resources of the slave device may be accessed by a master device addressing those resources via the bus; and means for converting addresses to be used by a master device to access resources of the slave device to internal addresses to be used for those resources by the slave device.

According to a twelfth aspect of the present invention, there is provided a method of operating a slave device for use in a microprocessor system, the slave device comprising means for coupling the slave device to a communications bus via which bus resources of the slave device may be accessed by a master device addressing those resources via the bus; the method comprising the slave device converting addresses used by a master device to access resources of the slave device to internal addresses to be used for those resources by the slave device.

Where the slave device uses address mapping and converts the addresses used by the master device to appropriate "internal" addresses to allow the appropriate resources to be accessed by the master device, then that address mapping is preferably carried out using software and preferably under the control of a processing unit on the slave device that sets the mapping relationship for the mapping means to use (i.e. which addresses map to each other). Setting and carrying out the address mapping in software effectively makes it possible to determine how the master "sees" the slave device simply by using software running on the slave device.

The address mapping and translation can be carried out as desired, but in one preferred embodiment is carried out using address page mapping as in conventional virtual addressing arrangements, i.e. by dividing the addresses to be mapped into fixed size groups that are then each mapped together in one operation. However, other address translation techniques could be used if desired.

The address mapping can be carried out at any desired level of "granularity". Thus, for example, full arbitrary address mapping could be used, e.g., where the slave device has only a few internal resources. Alternatively, coarser grained mapping may be used where it is desired to, for example, reduce the number of address mappings that need to be stored and implemented. Preferably the address mapping granularity is set equal to the slave device's internal resource granularity, as that has been found to provide good results.

The storage of the external and internal address relationships and their mapping and translation in use can be carried out by any device that can, e.g., appropriately accept master device access requests with virtual addresses, translate the virtual addresses to physical slave resource addresses, and forward the requests to the physical resources. Preferably the slave device includes a memory management unit for carrying out these functions.

It will be appreciated from the above, that where, inter alia, address mapping and translation is carried out on the slave device, then the slave device will need to be configured with the appropriate address mappings, etc., as necessary. This configuring of the slave device can be carried out in any suitable manner, but in a particularly preferred embodiment is achieved by appropriate programming of the slave device, e.g., by loading appropriate software onto the slave device that will then control the slave device to operate accordingly. Preferably the slave device is configured in this way by uploading a new program to a controlling processing unit of the slave device that replaces the whole or part of an or the existing configuration program running on the slave device. The slave device preferably therefore includes one or more programmable processing units that can be programmed for this purpose (e.g. to set for one or more of the resources on the slave device, the address or addresses that can be used by a master device to access that resource or those resources on the slave device).

Arranging the slave device to be configurable in this way by programming and using software is particularly convenient, as it, for example, allows, e.g., the access address relationships presented to a master device by the slave device to be configurable simply by appropriate programming of the slave device and/or by loading appropriate software onto the slave device.

The way that the slave device is programmed and software loaded onto it to set up and configure it in this way can be selected as desired. Preferably the slave device can be so programmed by a device external to the slave platform (when in appropriate communication therewith), and/or by a device internal to the slave device or the slave device platform.

For example, the slave device could itself run an internal program that determines the, e.g. address mappings, to set up, and then configures the slave device appropriately. This could involve, for example, the slave device determining appropriate address mappings and then storing those mappings for use by, e.g., a memory management unit on the slave device. In such an arrangement, the slave device, could, for example, attempt to determine the address mappings required by the master device, e.g. by analysing access patterns of the master device, and configure its interface accordingly. This may be appropriate where the master device operating system can or does treat the slave device as a dynamic, "hotpluggable" resource (and hence does not simply treat it as a static resource that it simply checks once at startup, but, for example, repeatedly checks and defines the slave device in use).

In a particularly preferred embodiment, the slave device can be programmed to, e.g., configure the address mappings and/or other aspects of the interface presented by the slave device, by a master device programming the slave device appropriately (once the slave device is in communication with the master device, e.g. installed in the overall system). Preferably this is done by the master device uploading to the slave device appropriate software that will run on an internal processor of the slave device, which software will then be executed and install itself as the interface configuration control on the slave device. The master device could be internal to the slave device or on the slave device platform, or "external" thereto and, e.g., in communication with the slave device via a communications bus. Preferably the slave device is so programmable by a master device that is not on the slave device platform itself.

It is believed that such an arrangement may be new and advantageous in its own right. Thus, according to a thirteenth aspect of the present invention, there is provided a slave device for a microprocessor system, comprising: means for communicating with a master device via a communications bus, and means for allowing a master device to program the slave device to configure the interface the slave device presents to the communications bus.

According to a fourteenth aspect of the present invention, there is provided a method of configuring a slave device for use in a microprocessor system, comprising:

a master device of the microprocessor system programming the slave device via a communications bus linking the master and slave device to set the interface presented by the slave device to the communications bus.

To facilitate its programming by a master device, the slave device preferably sets up itself an interface that allows the master to program the slave device, e.g. to upload the relevant software. This interface can and preferably is relatively small and simple and arranged out of the way of any other interfaces set up on the slave device. This interface will, for example, be configured for a predefined communications protocol via which the master will program the slave device.

In a particularly preferred embodiment, the slave device includes means, such as firmware, that can marshal and control what the programming and software uploaded to the slave device (by a master device or otherwise) can do. This is desirable to help retain the integrity of the slave device, and to counter, for example, any flawed or malicious software that might be uploaded to the slave device. Preferably the programming and software uploading uses techniques to enhance the security of the process, to, e.g. make sure that any new program is safe to run. Such techniques could include, for example, the use of encryption, digital signatures, and/or the testing of the new code in a virtual sandbox or cage.

It will be appreciated that in these arrangements, the master device configures the access and internal address relationships and thus the interface presented by the slave device. This means, inter alia, that the master device can control, and set very tightly if desired, the communications protocol and relationship between itself and the slave device and the software running on each side of the interface. In effect, the master device can arrange a "matched" set of software for itself and the slave device, one part of which it transfers to the slave device and one part which the master runs on its processor. Since the software is matched, each part knows the communications protocol to use and what to expect from the other part of the software. Thus, for example, the master device could configure the slave device to tailor and optimise the slave device's interface for the slave device driver software running on the master device.

Where the slave device can be configured by being programmed as discussed above, then it can preferably be repeatedly so programmed in use. This will allow the interface presented by the slave device to a communications bus, e.g. the relationships and associations between addresses used by a master device and the slave device's resources (i.e. the address that should be used by a master device to access a given slave device internal resource), to be altered in use simply by appropriate reprogramming of the slave device (e.g. by uploading new software to the slave device). Such altering of the address or addresses that can be used by a master device to access one or more resources on the slave device could be used, for example, when a different master device is to be used to access the slave device to change the access addresses for the internal resources of the slave device to match the addresses that will be used by the hardware driver on the new master device for those resources, thereby allowing the new master device to access those resources on the slave device directly and in a seamless manner, and without the need to change substantially the hardware driver on the new master device. Where the slave device can be programmed by a master device to configure it, then the new master device could itself program the slave device to change the interface presented by the slave device in this manner.

It is believed that the provision of a slave device in which the addresses to be used by a master device to access resources of the slave device can be changed in use may be new and advantageous in its own right. Thus according to a fifteenth aspect of the present invention, there is provided a slave device for a microprocessor system, comprising:

means for coupling the slave device to a communications bus via which resources of the slave device may be accessed by a master device by addressing those resources via the bus; and means for altering, for one or more of the resources on the slave device, the address or addresses that can be used by a master device to access that resource or those resources on the slave device.

According to a sixteenth aspect of the present invention, there is provided a method of configuring a slave device for a microprocessor system, which slave device comprises means for coupling the slave device to a communications bus via which resources of the slave device may be accessed by a master device by addressing those resources via the bus; the method comprising:

programming the slave device to set for one or more of the resources on the slave device, the address or addresses that can be used by a master device to access that resource or those resources on the slave device.

In a particularly preferred embodiment, as well as being able to alter (in use) the addresses that can be used by a master device to access some resources on the slave device, other resources on the slave device have access addresses that are fixed and that cannot be altered in use (i.e., such that, where address relationship mapping is used, there is static (unchanging) mapping between the access address to be used by a master device and the internal address used by the slave device for those resources).

The "fixed" address resources can be selected as desired but are preferably resources that tend to have the same access address across different slave devices of a given type, such as lower level resources.

For example, the Applicants have found that in practice, for certain 3D graphics processing platform resources, the same addresses tend to be used to access those resources whatever 3D graphics processing platform hardware driver is being used (i.e. such that the addresses used to access those resources are the same for a number of (or all) 3D graphics processing platform hardware drivers). Such resources that tend to have the same access address across different 3D graphics processing platforms are typically low level resources, such as low level PCI configuration registers (e.g., as is known in the art, the address number used to allow a given slave device to distinguish accesses to itself from accesses to other slave devices on the same bus), etc.

Given that the addresses used to access these resources do not tend to change, the Applicants have recognised that it may be unnecessary therefore to alter the addresses used to access these resources and indeed that it may therefore be simpler and more economical to fix the addresses used to access such resources. (However, it should be appreciated that although the address used to access the resource may be fixed, the content of the resource is not fixed and the resource is not in other ways excluded from normal operations, etc., of the resource or the slave device.)

It is believed that this arrangement may be advantageous in its own right. Thus, according to a seventeenth aspect of the present invention, there is provided a slave device for use in a microprocessor system, comprising:

means for coupling the slave device to a communications bus via which bus resources of the slave device may be accessed by a master device by addressing those resources via the bus; and means for altering the addresses to be used by a master device to access resources on the slave device; wherein:

some but not all of the address or addresses to be used by a master device to access one or more resources on the slave device are alterable.

According to an eighteenth aspect of the present invention, there is provided a method of configuring a slave device for use in a microprocessor system, which slave device can be coupled to a communications bus via which bus resources of the slave device may be accessed by a master device addressing those resources via the bus; the method comprising:

setting the addresses to be used by a master device for accessing some resources on the slave device such that those addresses can be altered by programming the slave device; and setting the address or addresses to be used by a master device for accessing one or more other resources on the slave device such that the addresses to be used to access those resources are fixed and cannot be altered by programming the slave device.

The provision of such "fixed" address resources can be achieved as desired. For example, where address mapping and translation is used, the address relationship mappings of addresses for the "fixed" address resources could simply be unalterably set in the address relationship store (table). For example, the access address that will be used by a master device to access a resource could be set to match the internal address for that resource.

However, in a particularly preferred embodiment, the resources having fixed addresses are provided such that they can be accessed directly by a master device and without the need for any intermediate address translation (mapping) stage. This is preferably achieved by making the "fixed" address resources directly available over the communications bus used to communicate with the master device, rather than, e.g., any such communication having to be via an address translation stage of the slave device, and preferably also without the communication having to be via, e.g., an internal bus of the slave device. Access to such resources would then effectively proceed "untranslated". This avoids, e.g., accesses to such resources having to pass via other units and resources of the slave device.

It is believed that such an arrangement may be new and advantageous in its own right. Thus, according to a nineteenth aspect of the present invention, there is provided a slave device for use in a microprocessor system, comprising:

means for coupling the slave device to a communications bus via which bus resources of the slave device may be accessed by a master device by addressing those resources via the bus; wherein:

one or more resources of the slave device can be directly addressed by a master device and one or more other resources of the slave device must be addressed by a master device via an address translation stage of the slave device.

According to a twentieth aspect of the present invention, there is provided a method of operating a slave device for a microprocessor system, which slave device comprises means for coupling the slave device to a communications bus via which bus resources of the slave device may be accessed by a master device by addressing those resources via the bus; the method comprising:

when receiving an access request from a master device addressed to one or more resources of the slave device, allowing the master device to address those resources directly; and when receiving an access request from a master device addressed to one or more other resources of the slave device, passing those access requests to an address translation stage of the slave device.

As is known in the art, and as discussed above, communications between a slave device and a master device normally take place according to a defined communications protocol that sets, e.g., the form of the data and the commands that can or must pass between the master and slave. This is because generally speaking, the hardware resources on a slave device will only be able to accept data in a particular form, and therefore the slave device hardware driver on the master will be set to send data to the slave device in that form.

For example, in a typical 3D graphics enabled system, the master host microprocessor will itself generate the initial 3D graphics data, such as the initial primitive data, for the required graphics in response to calls for 3D graphics display from an application running on the host microprocessor and pass that data with the appropriate commands to the slave 3D graphics processing platform. In such an arrangement, if the 3D graphics processing platform does not receive the appropriate initial data from the master host processor, it cannot carry out the relevant 3D graphics processing operations.

Thus, in master and slave arrangements, the form of commands and data that the slave device hardware driver on the master sends to the slave device is usually predefined and fixed to meet a particular communications protocol. However, that then constrains the form in which data, etc., can be sent to the slave device.

However, where a slave device in accordance with the present invention can respond to access requests from a master device on a per access basis, then that facilitates changing the communications format and protocol that the slave device can accept. This is because, for example, it would allow access requests that do not use the appropriate communications format for the hardware resources of the slave device to instead be handled initially in software on the slave device where they could then be converted to a form appropriate for the hardware resources of the slave device before being passed to those resources. This could be achieved, e.g., by running software on the slave device that "knows" both communications protocols (i.e. for the access requests and the hardware resources) and can convert efficiently between those protocols.

Thus, in a particularly preferred embodiment the slave device of the present invention can be arranged to accept different forms of communication, such as different formats of commands and data, from a master device. Most preferably it can be arranged to operate according to different master-slave communications protocols. In a particularly preferred such embodiment, the master-slave communications protocol that the slave device accepts or can use can be changed in use (e.g. when the slave device is installed and operating in a microprocessor system). In such arrangements the slave device could use one communications protocol at any one time, or be able to use plural different communications protocols simultaneously.

Preferably the communications protocol to be used by the slave device can be configured (and changed) by appropriate programming of the slave device (e.g. by uploading to the slave device software that "knows" the new communications protocol to be used for access requests and the communications protocol for the slave device's hardware resources and that can convert between the two protocols). This programming can preferably be done by a master device as discussed above. Preferably the slave device includes a programmable unit or units for this purpose (which is preferably the same unit or units that control and/or carry out the address mapping and/or responding to accesses in software if provided).

Such arrangements would allow the slave device to accept communications, such as data and commands, from a master device in different formats, simply by, for example, programming the slave device to appropriately accept and respond to communications from a master device in the relevant format. This would allow, for example, the interface that the slave device presents to a master device in terms of the commands and data the slave device requires from the master device to carry out its operations to be altered.

It is believed that such arrangements may be new and advantageous in their own right. Thus according to a twenty-first aspect of the present invention, there is provided a slave device for a microprocessor system, comprising:

means for coupling the slave device to a communications bus via which bus resources of the slave device may be accessed by a master device; and means for altering the format of communications that the slave device can accept from a master device to access the slave device's resources.

According to a twenty-second aspect of the present invention, there is provided a method of configuring a slave device for a microprocessor system, which slave device comprises: means for coupling the slave device to a communications bus via which bus resources of the slave device may be accessed by a master device; the method comprising:

programming the slave device to set the format of communications that can be accepted by the slave device from a master device to access the slave device's resources.

As discussed above, in existing master and slave arrangements, the master-slave communications protocol is usually arranged such that the master device provides communications in a form directly suitable for the slave's hardware resources. Communications, and in particular data, in this form that is directly suitable for the slave's hardware resources is often referred to as being "native" readable, since it can be directly input to the "native" hardware resources on the slave device.

Generally speaking there will be a number of functions that need to be carried out in software between the application requiring slave resources on the master device and the provision of the relevant data, commands, etc., in "native readable" form to the actual physical resources on the slave device. These functions to generate the "native readable" data are usually carried out by the slave hardware driver on the master device, so that the commands and data, etc. sent to the slave device are in the form acceptable to the slave device's resources without the need for further modification by the slave device. The "native readable" commands data, etc. can then simply "pass through" the slave device to the relevant slave device resource.

However, where the slave device can carry out some of the data processing functions normally carried out by the master device (e.g. because it has the software or resources to do so, or the master device can or has programmed the slave device (e.g. as discussed above) to do so, e.g. by uploading appropriate software to the slave device to allow it to do so), the slave device itself could carry out some or all of the immediate operations normally carried out by the master device necessary to place the communications in a format suitable for the hardware resources on the slave device. In such an arrangement, it would not then be necessary for the master device to carry out those functions, provided the slave device can accept communications in the appropriate format, which the present invention, as discussed above, facilitates.

Indeed, in a preferred embodiment, the slave device can be programmed, preferably by a master device, to carry out one or more of the data processing functions (normally) carried out by a master device in relation to accesses to the slave device. For example, in the case of a graphics processing system, the master device could upload one or more graphics handling routines normally executed on the host processor to the slave device.

These arrangements of the present invention where the slave device can be arranged to accept communications in different formats and/or programmed to carry out (additional) data processing functions, can be used, inter alia, to allow some or all of the "slave device" operation functions that would normally be carried out on the master device to instead be carried out on the slave device (subject to the slave device having suitable resources, or being suitably programmed, to carry out these functions).

This would allow, for example, the offloading of some of the master device's normal slave device driver functions and other routines to the slave device, thereby reducing the processing burden on the master device. The master device could, for example, spread the computing "workload" between the slave device and master device based on the computing resources available on each device, by setting appropriately the communications protocol between the master and slave.

For example, where the slave device is a 3D graphics processing platform arranged as a guest platform in a host microprocessor system, such an arrangement would allow the slave 3D graphics processing platform to carry out one or more functions that would normally be carried out by the master host processor by allowing the slave graphics processing platform interface to accept appropriate commands and data from the master host system. Such an arrangement could, in effect, be used to offload functions from the master host processor to the slave 3D graphics processing platform, thereby, for example, reducing the processing burden on the host processor and/or potentially improving the combined performance of the host processor and slave 3D graphics processing platform system.

Thus a particularly preferred application of these arrangements and embodiments of the present invention is to offload (transfer) slave device driver processing functions from a master device to the slave device. Thus the present invention also extends to the use of a slave device in accordance with the present invention to offload slave device driver processing operations from a master device to the slave device.

Such arrangements are particularly applicable where the slave device can be programmed, e.g. to set its communication protocol, by a master device, since then the master device can itself set the communications protocol so to allow it to offload functions to the slave device (and program the slave device to carry out the appropriate data processing routines, if necessary), as it desires.

It will be appreciated that in such arrangements the slave device would be configured to accept given data and/or commands from a master device and also then to carry out the relevant functions relating to those commands and data if it cannot already do so.

Thus, according to a twenty-third aspect of the present invention, there is provided a method of configuring a slave device for a microprocessor system, which slave device comprises one or more internal processing units, the method comprising:

programming a processing unit of the slave device processor to accept selected data and/or commands from a master device; and programming a processing unit of the slave device to carry out one or more functions corresponding to the selected data and/or commands.

Allowing the format of communications such as data and commands that the slave device can accept from a master device to be altered from a "native" readable form also facilitates, for example, allowing a master device to send appropriate slave device commands and data to the slave device using higher level (and hence more compact) descriptions of the data and commands, thereby reducing the bandwidth requirement on the communications link (e.g. bus) for that communication transfer.

In these embodiments of the present invention, the interface presented by the slave device can (subject to the slave device having suitable resources to handle communications in the desired format) preferably be arranged to accept commands and data at any desired immediate stage between receiving "native" readable slave hardware resource data (such as would be the case in existing slave device systems) (which the slave device would preferably then pass straight through to the relevant slave device resource unit), to receiving and accepting essentially raw or near raw (slave) device driver API calls (i.e. calls from applications running on or communicating with the master device for slave device resources that would normally be recognised and processed accordingly by a slave device hardware driver on the master device).

Where the slave device of the present invention can accept communications from a master device that are not "native readable", then it will need to generate data that is readable by its native hardware resources from the communications, e.g. commands and/or data, received from the master device. This is preferably done by software running on the (or an) internal processing unit or units of the slave device.

It is believed that such an arrangement may be new and advantageous in its own right. Thus, according to a twenty-fourth aspect of the present invention, there is provided a slave device for a microprocessor system, comprising:

means for coupling the slave device to a communications bus via which bus resources of the slave device may be accessed by a master device; and means for generating native readable data for use by resources of the slave device in response to commands and data received from a master device for slave device operations.

According to a twenty-fifth aspect of the present invention, there is provided a method of operating a slave device for a microprocessor system, which slave device comprises: means for coupling the slave device to a communications bus via which bus resources of the slave device may be accessed by a master device; the method comprising:

the slave device generating native readable data for use by resources of the slave device in response to commands and data received from a master device for slave device operations.

In such arrangements where the slave device is a 3D graphics processing platform, it will, inter alia, have to, if appropriate, generate (initial) data (such as geometry data) for graphics primitives in response to the commands for 3D graphics to be displayed that it receives.

Thus, according to a twenty-sixth aspect of the present invention, there is provided a 3D graphics processing platform, comprising:

a rasterisation module for rasterising graphics primitives for display on a display screen;

a rendering module for rendering the rasterised graphics primitives; and a processing module for generating data including at least geometry data representing graphics primitives to be rasterised and rendered in response to commands for 3D graphics to be displayed.

According to a twenty-seventh aspect of the present invention there is provided a 3-D graphics enabled computer system, comprising a host microprocessor and a 3D graphics processing platform that can communicate with each other, the host processor comprising:

means for running or communicating with software applications that can require the display of 3D graphics;

means for recognising calls for 3D graphics display from software applications running on or communicating with the host microprocessor and for passing those calls to the 3D-graphics processing platform;

the 3D-graphics processing platform comprising:

means for recognising calls for 3D graphics display sent by the host processor and for generating data representing graphics primitives in response to such calls;

a rasterisation module for rasterising graphics primitives generated in response to the calls for 3D graphics display; and a rendering module for rendering the rasterised graphics primitives.

In a particularly preferred embodiment, the slave device of the present invention is arranged so as to be able to accept raw or near raw (slave) device driver API calls. In such an arrangement, for example, state and management of data would be held and done on the slave device, with the API calls to modify the state being forwarded by the master to the slave device. In effect, in such an arrangement the slave device would present an interface to the master device that is effectively equivalent to the interface that a slave device hardware driver on the master device would present to applications on or communicating with the master device requiring the slave device's resources, and would carry out (all the necessary) routines normally found in the slave device hardware driver.

Most preferably, in this arrangement the master device is arranged to (and only needs to) recognise and pass (slave) device driver API commands (calls) to the slave device. The master device can have, for example, a slave device API-client that recognises and passes slave device driver API calls to the slave device to do this. In such an arrangement, rather than the master device acting upon commands from applications running on it or communicating with it for the "offloaded" function, it would simply pass those commands straight to the slave device processor, with the slave device then acting upon those commands instead.

This arrangement is advantageous, because it effectively maximises the functions that are offloaded from the master device to the slave device. Furthermore, as the master device "slave driver" software need only contain functions to allow it to, for example, initially configure the slave device interface and then in use act as a simple tunnel interface forwarding calls for slave device resources from applications running on or communicating with the master device in an effectively (more or less) raw form, the slave device driver software that must be loaded onto the master device to control the slave device can be very simple and small compared to existing slave device drivers, thereby allowing it to be ported to different operating systems and architectures more easily and at a lower cost. This facilitates, for example, using the slave device of the present invention with many different operating systems and architectures and adding it to existing systems without too much difficulty. It also removes the need for the master device to execute a "full" slave device driver, thereby reducing the processing burden on the master device.

In such an arrangement where the slave device is a 3D graphics processing platform, the master device would simply pass raw 3D graphics API calls directly to the slave device (subject to conforming them to any communications bus protocol).

Thus, according to a twenty-eighth aspect of the present invention, there is provided a 3D graphics enabled computer system comprising a host microprocessor and a 3D graphics processing platform that can communicate with each other, the host processor comprising:

means for running or communicating with an application program that can require 3D graphics processing operations and that will issue 3D graphics API calls for 3D graphics processing operations;

means for recognising a 3D graphics API call from an application program running on or communicating with the host processor and for communicating the 3D graphics API call to the 3D graphics processing platform;

the 3D graphics processing platform comprising:

means for receiving the 3D graphics API call from the host processor; and means for carrying out a 3D graphics processing operation in response thereto.

According to a twenty-ninth aspect of the present invention, there is provided a method of operating a 3D graphics enabled computer system comprising a host microprocessor and a 3D graphics processing platform that can communicate with each other, the method comprising:

the host processor:

recognising a 3D graphics API call from an application program running on or communicating with the host processor and communicating the 3D graphics API call to the 3D graphics processing platform;

the 3D graphics processing platform:

receiving the 3D graphics API call from the host processor; and carrying out a 3D graphics processing operation in response thereto.

In a particularly preferred arrangement of these aspects and embodiments of the present invention, the slave device is configured to be able to accept communications under two (or more) different communications protocols at the same time. In such an arrangement, one of the protocols preferably allows forwarding data and commands from the master device straight to the slave device's resources (i.e. uses data, etc., in a native format that the slave device's resources are be able to understand and use without further conversion), with the other (or another) protocol using communication formats unreadable to the internal resources of the slave device (and thus demanding operations on it and more management by the/an internal processor of the slave device). Most preferably the slave device is arranged such that it can recognise if it in fact receives native readable data from a master device, and then simply allow that data to "pass through" to the relevant slave device resource, and such that if it does not receive native readable data from the master device, it will then generate native readable data from whatever data and commands it receives from the master device.

The slave device of the present invention can be any such device that can provide "slave" resources for use by a master. Thus it could, for example, be in the form of an add-in card for a microprocessor, but it could also be a more complex device such as a more general microprocessor system or CPU. In a particularly preferred embodiment the slave device is a graphics processing platform, preferably a 3D graphics processing platform, and, indeed, the present invention extends to a graphics processing platform for a computer system having any one or more or all of the features discussed herein.

In a particularly preferred embodiment, the slave device can also itself act as a master device, e.g. to access resources on other slaves in the system, for example that it can communicate with via the communications bus linking it to the master device. For example, it may be desirable for the slave device to be able to access (slave resource) memory associated with the master device, without needing to do so via processing units of the master device. Thus, the slave device preferably has bus mastering abilities.

The master device can also be of any suitable type and may typically be or include a CPU of some form. As discussed above, the master device can provide slave resources accessible to the slave device (or other master devices), as well as acting as a master in respect of the slave device's resources.

It will be appreciated therefore that where the present application talks of "master" and "slave" devices, etc., that is in the context of the communications exchange between the devices at any given time and that, in particular the same device may be able to act as both master and slave, either at the same or different times. Thus references to a "slave" device do not preclude the slave device also being able to act as a "master" and vice-versa.

The master device could be a device external to the slave device or platform, such as might typically be the case in a "host" and "guest" arrangement. However, the present invention is equally applicable where the master device is "internal", e.g. on-chip with the slave device. Generally speaking the present invention is particularly applicable where there is "logical" separation between the master and slave, although there does not need to be "physical" separation therebetween.

The slave can also be arranged to respond to more than one master device, such as both an external master device and one (or more) internal masters. In this case, each master device is preferably allocated its own part of the internal address space of the slave device (where internal addressing is used).

The various functions of the slave device, such as the address mapping (translation) process, generating in software responses to external accesses for which there are no appropriate internal resources available on the graphics processor, etc., are preferably carried out by one or more internal processing units, such as an internal CPU, that the slave device includes for this purpose (which, as will be appreciated by those skilled in the art, may not be the only processing unit or units of the slave device). The processing unit that handles the address misses at least should be able to handle address miss signals generated by the slave device and respond appropriately. It should therefore be able to handle interrupts but otherwise can be of any processing unit type (RISC, CISC, etc.). When an address miss occurs the processing unit preferably stops any work that it is currently doing and starts executing instructions for handling the address miss. These instructions are preferably part of the "trusted code" running on the processing unit, such as part of its operating system.

The slave device preferably includes, as discussed above, an address translation unit, preferably in the form of a memory management unit (MMU), that carries out address mapping and recognises when an external access address has no corresponding internal address (i.e. is left unmapped), and signals that event to the appropriate internal processing unit of the slave device (preferably by an interrupt signal). Where the slave device can respond to more than one master device, the address translation unit could control and map accesses from all master devices, or only a selected number of them, such as single master. For example, accesses from external masters could proceed via the address translation unit, but access from internal masters not do so.

The slave device preferably also includes, as discussed above, a table lookaside buffer and/or one or more buffers into which read or write access data can be written together with any necessary control logic for managing those buffers. In one preferred embodiment these buffers are associated with the address translation unit of the slave device, although they could be provided elsewhere, such as as sovereign units on the slave device.

The internal resources that the slave device makes available to a master device can be any suitable such resources, such as memory units (e.g. generic memory, frame buffer memory, etc.), processors (which may include some addressable resources for configuration, debugging, etc.), configuration and command registers, status registers, input and output buffers of active units, colour tables (for graphics resources), etc. Where the slave device is a 3D graphics processing platform, the slave resources could comprise, e.g., a rasterisation module and a rendering module, and/or other 3D graphics operations modules, such as transformation modules, and/or lighting modules, etc. In such arrangements, the slave device preferably provides as slave resources at least a rasterisation module for rastering graphics primitives for display on a display screen, and a rendering module for rendering the rasterised primitives.

The slave device can be coupled to the communications bus for communicating with the master device by any suitable means. In one preferred embodiment, the communications bus is coupled directly to the address translation unit, e.g., memory management unit, of the slave device (i.e. the address translation unit, e.g. MMU, can communicate directly on the (master-slave) communications bus). This may be appropriate where there is a single master device accessing the slave device via a single communications bus.

In another preferred embodiment, the communications bus is not coupled directly to the address translation unit of the slave device, but is coupled to another unit of the slave device, which unit then preferably, inter alia, interfaces between the communications bus and the address translation unit of the slave device. Most preferably the slave device includes a distinct unit that can be coupled to a communications bus (a bus frontend unit) and which interfaces between a (master-slave) communications bus and internal units of the slave device. The bus "interfacing unit" should, e.g., forward accesses received from a master device over the communications bus with the master device to the appropriate internal units of the slave device, such as the, e.g., address translation unit, e.g. memory management unit, of the slave device, for subsequent processing.

This type of arrangement may be desirable where it is envisaged that there may be more than one master accessing the slave device, and in that case, the bus interfacing (frontend) unit could operate to, e.g., couple plural external master devices using the same or different communications buses to the slave device. It could also, for example, be used to separate internal masters on the slave device (and an internal slave communications bus) from external masters and an external (e.g. host) communications bus.

Where a separate bus interfacing unit, e.g., bus frontend unit is used, and some resources of the slave device are to be provided as fixed, static addressed resources, then those fixed-address resources are preferably provided in the bus interfacing unit (e.g. bus frontend unit), with the bus interfacing unit then making those resources directly available to a master device over the communications bus that links the master and bus interfacing unit (such that such access requests then do not have to proceed beyond the bus interfacing unit to other units of the slave device).

Where a separate bus interfacing unit, e.g. bus frontend unit, is provided, the storage locations, e.g., buffers for storing read and write values, etc., when read and write values cause address misses could be provided in the bus interfacing unit, rather than, e.g., with the address translation unit (e.g. MMU) or another processing unit of the slave device. In that case, "per access" address miss handling using those storage locations would only be possible for access requests coming via the bus interfacing unit (e.g. from an external master device that communicates with the slave device via the bus interfacing unit). As will be appreciated from the above, in a particularly preferred embodiment of the present invention, the slave device will include, inter alia, a unit that is connectable to a communications bus over which a master device can then communicate with the slave device, a memory management unit (MMU) that will, inter alia, map addresses used by a master device to internal addresses of the slave device, read and write buffers, and a programmable internal processor (CPU), as well as other internal resources relating to, e.g., 3D graphics processing operations.

It is believed that such an architecture for a slave device is new and advantageous in its own right. Thus, according to a thirtieth aspect of the present invention, there is provided a slave device for a microprocessor system, comprising:

one or more internal resources;

means for coupling the slave device to a communication bus via which the internal resources of the slave device may be accessed by a master device by addressing those resources via the bus;

a memory management unit for mapping addresses used by a master device to access resources of the slave device to internal addresses to be used for those resources by the slave device; and a programmable processing unit for controlling the address mapping, and for generating a response to an access by a master device for which the slave device does not otherwise have a suitable internal resource.

The various units of the slave device, such as its slave resources, the address translation unit, storage buffers, controlling processor(s), bus interfacing unit (if provided) etc., can be arranged within the slave device as desired. They preferably communicate with each other via an internal bus or buses of the slave device. They could, for example, be functionally tightly connected, or, in alternative arrangements, be spread in a more distributed arrangement, perhaps then using more complex forms of communication between them. In one particularly preferred embodiment, the slave device is arranged on a single silicon platform, but that is not essential.

A slave device in accordance with the present invention will in particular, at least in its preferred embodiments, facilitate the alteration of the interface it presents to a master device, for example by providing the ability to dynamically map access addresses to be used by a master device to internal addresses for use by the slave device (thereby controlling what resources a master device can access at what addresses), together with the ability to generate a response in software where the appropriate internal resource may not be available. In effect, the slave device can treat what the master device sends and sees as accesses to "physical" addresses of the slave device's internal resources, as accesses to "virtual" addresses that are subject to internal address conversion (mapping) and, if necessary, interrupts that generate software responses. This gives the slave device control over the interface it presents to the master device.

Thus, a particularly preferred application of a slave device in accordance with the present invention is that it allows the interface that the slave device presents to a master to be varied in use, even in master and slave arrangements where the master and slave are more "separated", such as a 3D graphics processing platform and master host processor system. This contrasts with existing slave devices where the interface presented by the slave device is fixed.

Thus, according to a thirty-first aspect of the present invention, there is provided a slave device for a microprocessor system, comprising:

means for coupling the slave device to a communications bus for receiving signals via the bus from a master device for accessing resources on the slave device; and means for altering the interface the slave device presents to a bus coupling it to a master device.

According to a thirty-second aspect of the present invention, there is provided a method of configuring a slave device for a microprocessor system, which slave device comprises means for coupling the slave device to a communications bus for receiving signals via the bus from a master device for accessing resources on the slave device; the method comprising:

altering the interface the slave device will present to the communications bus.

According to a thirty-third aspect of the present invention, there is provided a computer system comprising a master device and a slave device that can communicate with each other, the master device comprising:

means for communicating access requests for slave resources to the slave device;

the slave device comprising:

means for receiving the access requests from the master device, and means for altering the interface the slave device presents to the master device.

The ability to alter the interface presented by the slave device to a master device means that, for example, as discussed above, the interface presented by the slave device can be varied to match the interface expected by given slave device hardware driver already existing on a given master device. Such an arrangement would mean, for example, that it would not be necessary to change the (entire) hardware driver on a host system when adding a slave device in accordance the present invention to that system, since the interface presented by the slave device in accordance with the present invention could be arranged to match the interface required for the hardware driver already present on the host system. In such a situation, the slave device of the present invention would, in effect, emulate the interface presented by the slave device for which the hardware driver is intended.

A slave device in accordance with the present invention can therefore allow the reuse of a host system's knowledge of a legacy (i.e. previously used) slave device interface, but with a new slave device (which could then, for example, provide enhanced functionality over the legacy device).

A slave device in accordance with the present invention could also, for example, be used to emulate the functionality of older, existing slave devices without the need for a hardware implementation of the older system (which may no longer exist, or may be complex to implement—with a slave device in accordance with the present invention, any complexity can be moved to the software on the slave device where it will generally be easier to handle).

Thus one particularly preferred use of a slave device in accordance with the present invention is to emulate a particular interface to be presented to a communications bus for connection to a master device (and in particular to emulate the interfaces expected by a given slave device hardware driver, i.e. provided by a given existing slave device). The present invention thus extends to the use of a slave device in accordance with the present invention to emulate the interface presented to a communications bus (master device) by another microprocessor slave device arrangement, such as a legacy hardware interface. In one preferred such embodiment a slave device in accordance with the present invention is used to emulate the functionality of older slave device systems without actually requiring a hardware implementation of the older system.

A slave device in accordance with the relevant aspects and embodiments of the present invention should be able to emulate any desired existing (or otherwise) slave device interface, subject to, for example, any physical communications bus constraints, and the ability of the programmable and processing units (e.g. the CPU) on the slave device to create resources and responses within any time limits of the relevant master device.

For example, a slave device in accordance with the present invention could be used to emulate PCI I/O requests to the slave device in software. This could be done by the slave device, as discussed above, recognising PCI I/O requests (e.g. by transforming them to interrupts internally (e.g. by leaving the relevant access addresses unmapped)), and then generating a suitable response in software, e.g. by running a program to interpret the attempted I/O request and produce an appropriate response. Additionally or alternatively, some or all PCI I/O request addresses could be mapped to appropriate resources of the slave device (where such resources exist). In a refinement of such an arrangement, the fixed resources that are common for all PCI devices could be allocated "fixed addresses" so that they don't require internal address translations.

Where the slave device is a (3D) graphics processing platform, then the slave device could, for example, be used to implement a VGA "register level" compatible system by using the PCI I/O emulation mechanism discussed above, together with a suitable interrupt handler and internal resource (such as memory) address remapping (whether to redirect access requests to the appropriate internal resource (e.g. memory area) or to generate a software generated response to the access request) running on the slave device, to emulate a VGA "register level" interface.

Such a system could have several benefits over a true hardware VGA implementation. For example, the complexity of the hardware implementation would be reduced (the complexity is instead moved to the handler software). Furthermore, correcting bugs in the VGA compatibility software should be easier than correcting bugs in a VGA hardware module would be, which could mean that correcting bugs in already deployed systems becomes feasible.

A graphics processing platform in accordance with the present invention could also support and/or emulate, for example, interfaces presented by more recent 3D graphics processor designs.

The ability to configure and customise the interface that the slave device presents to a master device also facilitates, for example, providing encryption and authentication functions across the interface to, for example, allow the slave device to validate any master device that attempts to access it and to secure any data transferred between the master and slave devices and stored on the slave device.

As well as interface alternation and configuration as discussed above, a slave device in accordance with the present invention can be used in and for other applications, as desired. For example, where the slave device has a pool of similar resources with hot swap capabilities, it would be possible to use those resources in different quality of service enhancing configurations in a manner that is invisible to the master device. For example, a number of equal resources could, e.g., be configured for voting with all accesses fed to all the equal resources, and the response given by the majority of the resources then being returned to the accessing master device. Furthermore, in such an arrangement, a resource that frequently gives a minority response could be taken as being faulty and hotswapped with a fresh unit.

Another application would be for "failover", where a backup resource is always fed the same access as a primary resource, thereby allowing the backup resource to take over seamlessly in the event of failure of the primary resource (which could then be replaced without disrupting the slave's service).

The way that a slave device in accordance with the present invention is implemented and operates in use can be selected as desired. As will be appreciated by those skilled in the art, it should include some software to initialize the slave device at start up. Such software is, as is known in the art, often referred to as "firmware". This initialization firmware (software) should be stored at the hardcoded memory addresses from which the internal processor will fetch instructions on power-up which it will then execute, as is known in the art, and is preferably stored in some form of non-volatile memory on the slave device.

The firmware that the slave device's processing unit or units executes on start up is preferably arranged to test and initialize all the modules and units on the slave device and to set up an interface for communications with a master device. The interface set up can take place as desired, but in a preferred embodiment is achieved by the firmware configuring the internal resources needed, setting up appropriate address mapping so that the internal resources of the slave device "appear" on the desired addresses as seen from a master device, and emulating in software any resources needed for the interface that are not otherwise available internally on the slave device (with the master access addresses that will be used by a master device to access those resources preferably being left unmapped to allow identification of those resources).

It will be appreciated that in these arrangements, the slave device needs to configure at least one interface on start up to allow it to communicate with a master device, even if that is simply to allow the master device to then reprogram the slave device to reconfigure its interface. However, it would be possible for the slave device to set up plural interfaces on start up and indeed, it is preferred that it does so. Thus, the slave device could, and preferably does, have multiple simultaneous interfaces (whether configured at start up or in use). In such an arrangement, each interface preferably has no overlapping or conflicting resources with any of the other interfaces.

In a particularly preferred embodiment where the slave device can support plural simultaneous interfaces, the slave device is configured at start up to present a first, "basic" interface (which, in the case of a 3D graphics processing platform could be a VGA interface) and a second interface whereby a master device can program the slave device to configure its interface (such as the interface emulation configuration interface discussed above). The "basic" interface preferably provides the master and slave with a smallest common denominator over which to communicate. The slave device is preferably configured to present also a third, more complex interface, such as a more complex legacy interface. These arrangements help to, for example, increase the flexibility and portability of the slave device. As these various interfaces can be set up and configured in software, that reduces the hardware complexity of the slave device.

Thus, according to a thirty-fourth aspect of the present invention, there is provided a method of configuring a slave device for a microprocessor system, which slave device comprises means for coupling the slave device to a communications bus via which bus resources of the slave device may be accessed by a master device, the method comprising:

configuring the slave device to present two different interfaces to the communications bus.

As will be appreciated from the above, when a master device makes an access request, a slave device in accordance with the present invention, at least in its preferred embodiments, will see if the address used in the access request has been mapped to an internal address of the slave device, and if it has, pass the access request to that internal address. If the address used in the access request has not been so mapped, then the slave device will run software to generate an appropriate response to the access request.

Thus according to a thirty-fifth aspect of the present invention, there is provided a method of operating a master and slave device interface, comprising the slave device treating accesses from the master device to the slave's internal resources as accesses to virtual addresses that are subject to mapping and for which some addresses used by the master device are left unmapped.

According to a thirty-sixth aspect of the present invention, there is provided a slave device for a microprocessor system, comprising:

means for mapping access addresses to be used by a master device to access internal resources on the slave device to internal addresses for use by the slave device for those resources; and means for generating a response in software to an access request from a master device for which an appropriate internal resource is not available.

In a master and slave system, the master and slave devices may communicate with each other over an interface. This communication may involve an access request affecting the operation of the slave device. The interface that the slave device presents to a master device may have the ability to be configured and customized. The ability to configure and customize the interface facilitates, for example, providing encryption and authentication functions across the interface to, for example, allow the slave device to validate any master device that attempts to access it and to secure any data transferred between the master and slave devices and stored on the slave device. This authentication and encryption provided across the interface ensures that the master device accessing the slave device (or platform on the slave device) has the credentials to do so and secures any data that is transferred and stored.

According to a thirty-seventh aspect, there is provided a device, comprising: a processor and memory having stored thereon a plurality of executable instructions which, when executed by the processor, cause the processor to: receive an access request affecting an operation of the device; facilitate encryption and/or authentication across an interface coupled to the device, wherein the interface is configured to secure the access request; and execute the access request.

The device may store error correction data. The device handles at least one error in the access request using the stored error correction data.

The access request may include at least one of a read request and a write request. The write request may include at least a value to be written to a resource of the device.

The device may interpret the access request and generate a response to the access request. In one implementation, the device may be configured to interpret access requests comprising commands and/or data in a predefined format. In another implementation, the device may be configured to interpret access requests comprising commands and/or data having different formats.

The access request may include commands and/or data. The generated response to the access request may include carrying out one or more functions related to the commands and/or data.

The access request may be a read request. During the read request, the device may send data associated with the access request to an accessing device.

The access request may be a write request. During the write request, the device may retrieve data from the access request and store the retrieved data.

The device may analyze the access request to determine one or more required resources. The one or more required resources may include one or more memory units, one or more processors, one or more registers, and/or one or more buffers.

The device may be configured to present one or more interfaces to an external device. The device may be configured to communicate via different protocols across the one or more interfaces.

According to a thirty-eighth aspect, there is provided a method for providing a command over a secure interface, comprising: receiving at a first device an access request from a second device; facilitating encryption and/or authentication across an interface between the first device and the second device, wherein the interface is configured to secure the access request; and executing, by the first device, the access request, the access request affecting operation of the first device.

The access request may be interpreted, e.g., by the first device or by a platform associated with the first device. The first device may generate a response to the access request.

The access request may include commands and/or data. Generating the response to the access request may include carrying out one or more functions related to the commands and/or data. The access request may be analyzed to determine one or more required resources.

According to a thirty-eighth aspect, there is provided a non-transitory computer-readable medium having stored thereon a plurality of computer-executable instructions which, when executed by a computer, cause the computer to: receive at a first device an access request from a second device; facilitate encryption and/or authentication across an interface between the first device and the second device, wherein the interface is configured to secure the access request; and execute, by the first device, the access request, the access request affecting operation of the first device.

As will be appreciated by those skilled in the art, the present invention also extends to computer and microprocessor systems and master and slave arrangements incorporating a slave device in accordance with the present invention and including any or all of the features discussed above.

As discussed above, a particularly preferred implementation of a slave device in accordance with the present invention is as a 3D graphics processing platform. Thus the present invention also extends to a 3D graphics processing platform incorporating any or all of the preferred features and aspects of the present invention.

The methods in accordance with the present invention may be implemented at least partially using software e.g. computer programs. It will thus be seen that when viewed from further aspects the present invention provides computer software specifically adapted to carry out the methods hereinabove described when installed on data processing means, and a computer program element comprising computer software code portions for performing the methods hereinabove described when the program element is run on data processing means. The invention also extends to a computer software carrier comprising such software which when used to operate a slave device for a microprocessor system or a master and slave arrangement comprising data processing means causes in conjunction with said data processing means said device or arrangement to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out hereinabove.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of preferred embodiments of the present invention will now be described by way of example only and with reference to the accompanying drawings, in which.

Figure 3:
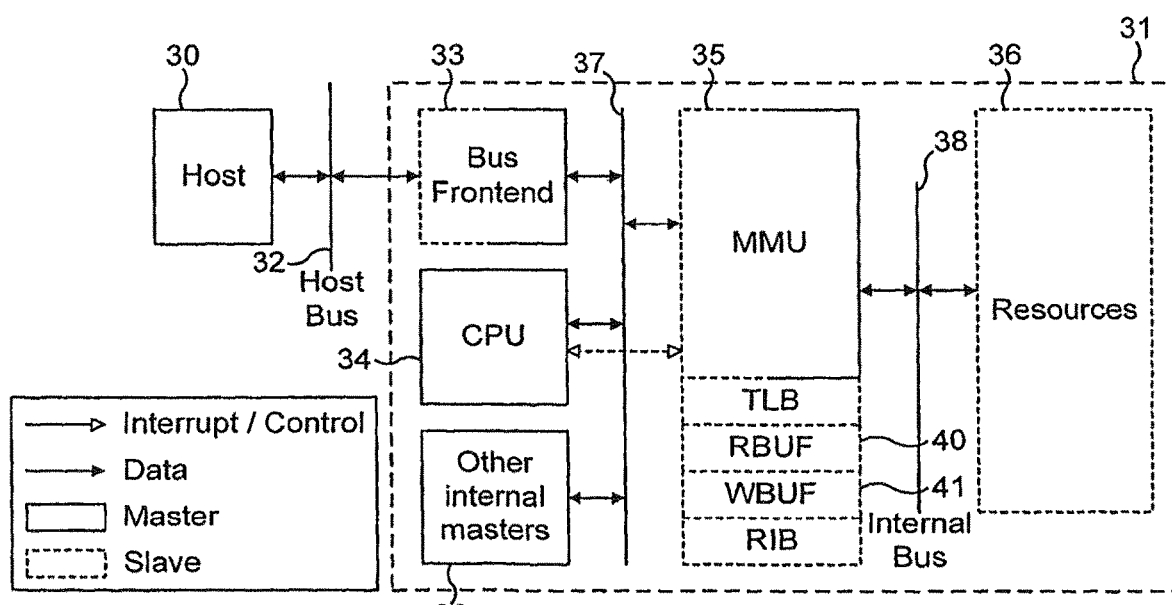
Figure 4A:
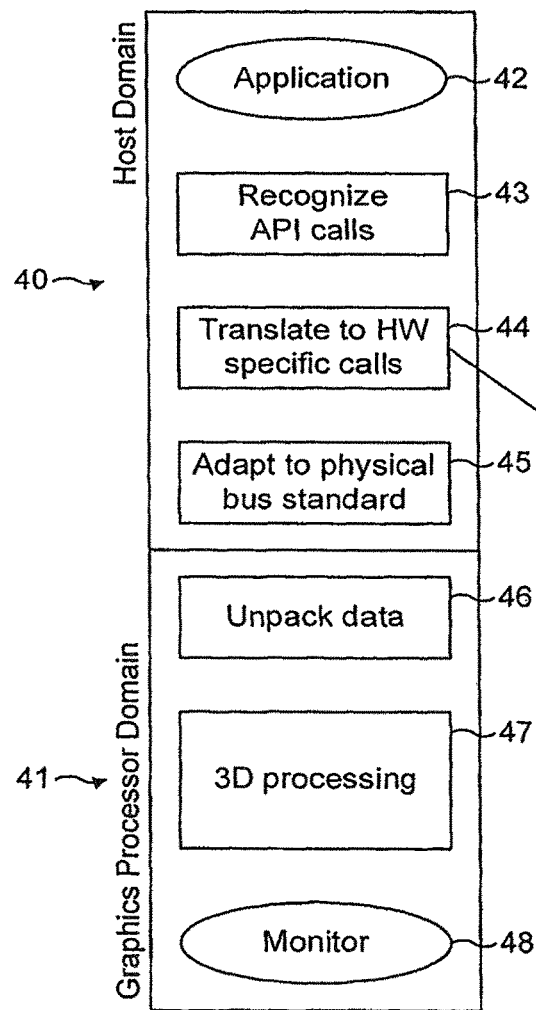
Figure 4B:
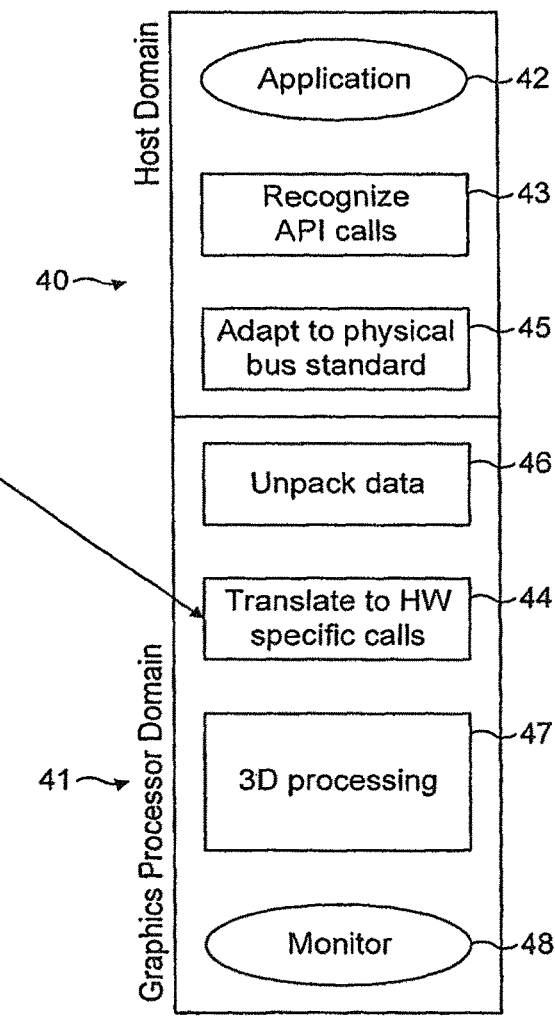

FIG. 3 shows an alternative embodiment of a slave device arrangement in accordance with the present invention; and FIGS. 4a and 4b show schematically the division between host processor domain and slave graphics processor domain functions for a typical prior art 3D graphics-enabled microprocessor system and for a 3D graphics-enabled microprocessor system using a slave 3D graphics processing platform in accordance with a preferred embodiment of the present invention.

Figure 1:
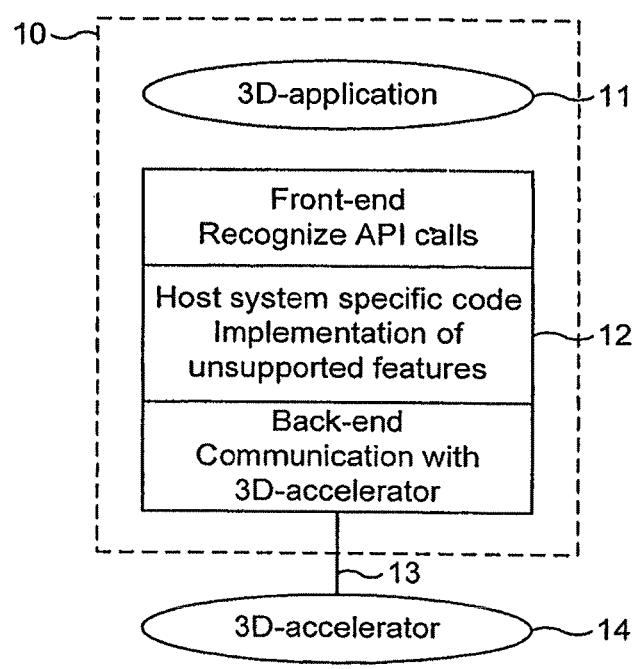
FIG. 1 shows schematically an exemplary host processor and dedicated 3D graphics processing platform arrangement.
Figure 2:
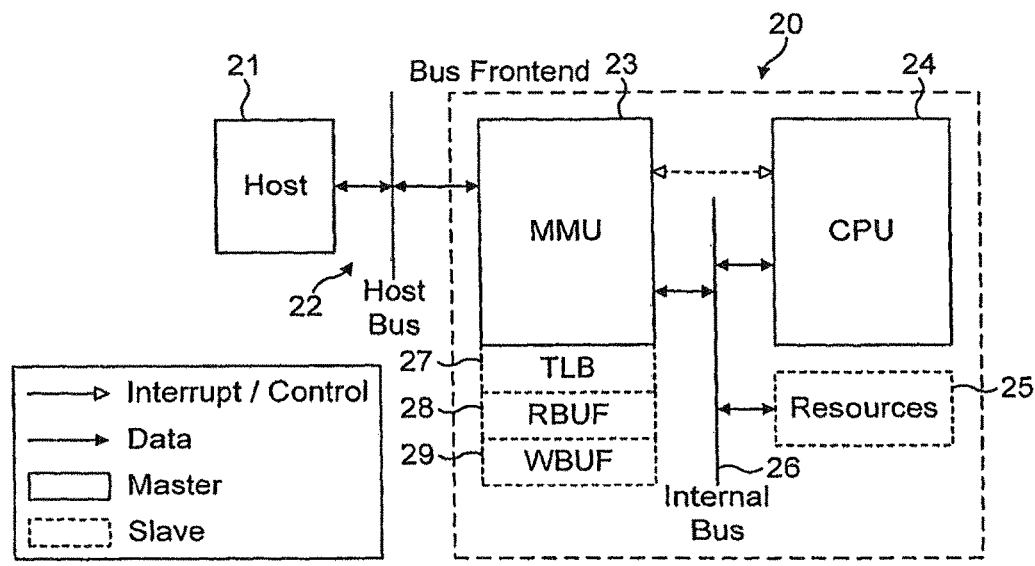
FIG. 2 shows schematically a preferred embodiment of the slave device arrangement in accordance with the present invention.

FIG. 2 shows schematically a first preferred embodiment of a slave device arrangement in accordance with the present invention. The slave device 20 is implemented as a platform that communicates with a host system 21 via a host communications bus 22.

The host system 21 includes one (or more) processing units that can act as bus masters and send access requests for slave resources on the slave device 20 via the communications bus 22.

The host communications bus 22 can be any suitable such bus. Thus it could, for example, comprise a shared general purpose bus such as a PCI bus, a special point-to-point bus such as a HyperTransport bus, or a dedicated bus appropriate to the slave device in question (such as a dedicated graphic bus, such as an AGP (Accelerated Graphics Port) bus, where the slave device is a graphics processing platform), etc.

The slave device platform 20 includes a memory management unit 23, a programmable central processing unit 24 and one or more slave resources 25, all of which are in communication with each other and can exchange data with each other via an internal bus 26 of the slave device platform. The memory management unit 23 can also exchange interrupts and control signals with the central processing unit 24, and both the memory management unit 23 and the CPU 24 can act as bus masters. It would also be possible for the slave device platform to include further (bus) master devices if desired. The memory management unit 23 also further includes a table lookaside buffer 27, a read buffer 28 and a write buffer 29.

The resources 25 that the slave device 20 makes available to a master device can be selected as desired and will depend on the actual slave device in question. They could include, for example, one or more of memory units (e.g. generic memory, frame buffer memory, etc.), processors (which may include some addressable resources for configuration, debugging, etc.), configuration and command registers, status registers, input and output buffers of active units, colour tables (for graphics resources), etc. As is known in the art, each internal resource 25 of the slave device 20 has its own true physical resource address which is used internally on the slave device to access that resource.

The memory management unit 23 acts as an address translating device, and accepts requests with virtual addresses from the master device or devices on the host system 21, translates the virtual addresses used in the access requests to the "internal" physical addresses of the slave's resources and forwards the accesses to the appropriate physical resources 25. The memory management unit 23 effectively separates the virtual world from the physical world.

The address translation is carried out using page mapping techniques, as is known in the art, although other address translation techniques could be used if desired. The mapping granularity is set equal to the slave device's internal resource granularity, although again, other arrangements are possible.

Mappings of address pages for the memory management unit 23 to use are stored in the Table Lookaside Buffer 27, as is known in the art. The slave device platform 20 also stores a larger set of mappings of address pages in its main memory, again as is known in the art.

The memory management unit 23 is coupled to the host bus 22 and can communicate directly with the host system 21 on the host bus 22. This means that only communications over the host bus 22 pass via the memory management unit 23 and can hence use virtual addresses to access the slave device's resources 25. Thus there is only one "master" on the "virtual" side, the host system 21. This reduces the complexity of the address translation, etc., process, as the slave device does not need to manage several masters on the virtual side. However, it would be possible to have plural masters on the virtual side, if desired. For example, it may be preferred for all master devices to be on the virtual side so that they can all use virtual addressing.

The controlling internal CPU 24 of the slave device platform 20 can be of any type (e.g. RISC, CISC, etc.), so long as it is programmable and able to handle interrupts. In this embodiment, the internal CPU 24 of the slave device is fully programmable and is the controlling processor of the slave device 20. It may not be the only programmable processor of the slave device 20, but it is the processor that manages the memory management unit 23 and that receives interrupts generated by the memory management unit 23 (see below). The CPU 24 stores as part of its operating system trusted code that runs on the CPU 24 and contains instructions for handling an address miss interrupt from the memory management unit 23.

The write buffer 29 is a buffer into which the memory management unit 23 can write the write value received from a master on the host system 21 on an access when an address miss occurs in the memory management unit 23. The write buffer is of sufficient size to accommodate a complete write transaction (which will be defined by the host bus 22 communications protocol over which the host master device 21 has sent the access) so as to allow the write request to be handled after the address miss has been resolved without the need to involve the originating master device on the host system 21.

The read buffer 28 provides a similar buffer facility for storing values relating to read requests that have generated an address miss. Again, the read buffer is of a size able to accommodate at least one complete read transaction (which will again be determined by the bus communications protocol).

As well as the information discussed above that is stored in the write and read buffers when an address miss occurs, it may also be necessary to store additional information that the controlling CPU 24 may need to handle an access that has caused an address miss that the CPU 24 cannot obtain from other suitable sources. Such additional information, for example, may be "request" data extracted from a request to give the controlling processor 24 enough information to action the request, and/or "response" data written by the controlling processor to make it possible for the memory management unit 23 to generate a bus correct answer to the access request.

For example, it may be the case that the memory management unit 23 does not itself record whether an address miss generating access request was a read or write request, but only serves the CPU 24 with the address causing the address miss. In that case it would be necessary for the type of request to also be stored in an appropriate buffer memory so that the CPU 24 can determine the type of access request that caused the address miss.

Another situation in which additional information other than simply the read or write values may need to be stored could be where the master device(s) on the host system 21 can send access requests using a more complex protocol that, for example, supports multiple read requests with out of order replies. In such an arrangement, each read request would normally be tagged with a request number that the reply must also be tagged with so that the requesting master device can distinguish between replies and match replies to its requests. In such a system, the CPU 24 would need to have access to the relevant read request tags to be able to provide appropriate responses to the master device (and, e.g., associate the correct tag number with the reply to the read request to be sent to the master device).

This additional information could be stored, for example, in the write and read buffers, as appropriate, or the memory management unit 23 could have a further buffer associated with it for storing this information.

It will be appreciated that the various buffer memories of the slave device 20 can be arranged as desired, and could, for example, comprise separate memory devices, or different storage locations in the same memory device.

In use of the slave device arrangement shown in FIG. 2, a master device on the host system 21 would, for example in response to an API call from an application running on the host system for a slave device resource or function, send an access request for the relevant slave resource to the slave device 20 over the host communications bus 22. That access request will identify the desired slave resource by using a virtual address for the relevant slave resource. The access request will be received and identified as such by the memory management unit 23 on the slave device 20, and the memory management unit 23 will then attempt to translate the virtual address used in the access request to the physical address of the appropriate slave resource 25 using the mappings of address pages stored in the Table Lookaside Buffer 27.

If the memory management unit 23 is able to map the virtual address used in the access request to a slave resource 25, it would then simply pass the access request to that resource and handle it in the appropriate manner.

However, when the memory management unit 23 cannot find an address translation for the virtual address used in the master device's access request in the Table Lookaside Buffer 27, it will send an address miss interrupt signal to the CPU 24 which will then stop the work it is currently doing and start executing its stored instructions for handling the memory management unit address miss. In the case of a write request causing an address miss, the memory management unit 23 will also write the write value (and any other necessary information (which it will also do for a read request causing an address miss)) in the write request to the write buffer 29 (or any other buffer provided for that purpose).

The memory management unit 23 then passes the handling of the access request over to the controlling CPU 24 which executes software to then resolve the address miss and handle the access request. The CPU 24 is programmed to be able to handle the access request causing the address miss in a number of different ways.

When an address miss occurs, the CPU 24 first decides whether it can and wants to map a slave resource 25 to the virtual address used in the access request. It could do this, for example, by loading a new mapping of an address page from the main address page mappings store to the Table Lookaside Buffer 27, or by configuring a new mapping of an address page and loading it into the Table Lookaside Buffer 27. Once the appropriate new mapping of an address page is loaded into the Table Lookaside Buffer 27, the controlling processor 24 will then signal the memory management unit 23 to restart the access request using the new mapping of the address page (and any other stored data relating to the access request, such as a write value stored in the write buffer 29 (in the case of a write request)). The restarted access request would then proceed as normal with it being passed to the appropriate (newly mapped) slave resource by the memory management unit 23. This arrangement will avoid the virtual address used in the access request causing address misses in future accesses to that virtual address.

Alternatively, the controlling processor 24 can decide to handle the access request that caused the address miss by itself without the mapping help of the memory management unit, i.e. on a "per access" basis (since this arrangement will lead to a new address miss the next time the virtual address causing the address miss is requested by a master device on the host system 21).

In this case, the CPU 24 could, for example, still identify a slave resource 25 to which the access request causing address miss can be applied, forward the access request to that resource, and then, where appropriate, collect a response from that resource and send it back to the master device on the host system 21 via the memory management unit 23 (but without loading any new mapping of an address page into the Table Lookaside Buffer 27).

Alternatively, where, for example, the slave device 20 does not have the physical resource 25 requested in the access request (or a compatible physical resource), then the CPU 24 is programmed to be able to handle the access request and generate any appropriate response thereto in software running on the CPU 24. In this case, the software running on the CPU 24 will use whatever resources are available to it to create and/or emulate any response the accessing device expects. (This can be done since every access made over the host bus 22 will follow a predefined communications protocol and so the software running on the slave device CPU 24 can be arranged to ensure that a response that adheres to that protocol will be generated, although, as will be appreciated by those skilled in the art, exactly how this is done will depend on the communications protocol being used and the resources 25 available on the slave device 20).

As discussed above, in the case of a write request that causes an address miss, the memory management unit 22 also writes the write value included in the write request in the write buffer 29 so that that value is available to the CPU 24 and memory management unit 23 for completing the write request.

In the case of a read request causing an address miss, where the CPU 24 decides not to map a resource to the virtual address causing the address miss and then have the memory management unit 23 restart the request using the new mapping of an address page, the read value that is generated in response to the access request (either by the CPU 24 forwarding the request to a slave resource 25 or by software running on the CPU 24) is written by the CPU 24 into the read buffer 28 to allow the memory management unit 23 to send that value to the master device on the host system 21 as a response to the read request. The actual transfer of the value or values in the read buffer over the host bus 22 to the host system 21 begins either on a signal from the controlling CPU 24 of the slave device 20, or commences automatically when the read buffer 28 is filled with a predetermined amount of data.

It will be appreciated that in this embodiment of a slave device in accordance with the present invention, the various functional units that handle access requests and address misses are tightly connected. However, it would also be possible to provide the various functional units such as the memory management unit 23 and the read and write buffers 28, 29, etc., in a more spread or distributed form and to use more complex forms of communication between them. For example, these various functional units could be provided as sovereign units, communicating via an appropriate internal bus or buses. The actual distribution of the functionality that is used will depend, for example, on the exact implementation of the slave device and any other surrounding factors.

FIG. 3 shows a second preferred embodiment of a slave device arrangement in accordance with the present invention. The slave device arrangement shown in FIG. 3 basically includes the same components as the slave device arrangement in FIG. 2, such as a memory management unit 35, a controlling processor 34, and slave resources 36, all of which communicate with each other via internal buses 37, 38 of the slave device 31.

However, rather than the memory management unit 35 communicating directly on the host bus 32, a bus frontend interfacing unit 33 which interfaces between the host bus 32 and an internal bus 37 of the slave device 31 is provided. The memory management unit 35 then communicates with the external master device 30 via the internal bus 37 of the slave device and the bus frontend unit 33.

This type of arrangement may be desirable where it is desired to, e.g., separate "internal" masters 39 on the slave device 31 from the host bus 32.

The bus frontend unit 33 in this embodiment also provides some static or "fixed" address slave resources that can be accessed directly by an external master device 30 over the host communications bus 32 without the need to pass via other units or buses of the slave device 31. These resources are, as discussed above, resources that typically do not tend to change their access address over different slave device systems, such as low level configuration and legacy resources. The bus frontend unit 33 recognises accesses from the external master device 30 addressed to the static resources that it provides and makes those resources available directly to the master device 30.

For other accesses from the external master device 30, the bus frontend unit 33 forwards those accesses on the internal bus 37 of the slave device to the memory management unit 35, where they are then handled as discussed above.

To do this the bus frontend unit 33 prepends an internal address which is the top address of a subset of the internal address space of the slave device designated for "external" master address mapping to the address received in the access from the external master device 30 before forwarding the access on the internal bus 37 to the memory management unit 35. This means that all access addresses from the external master device 30 will have the same address prefix when they are sent to the memory management unit 35. This allows the memory management unit 35 to distinguish and keep separate address mappings for the external master device 30 from mappings done for any other (internal) masters accessing the slave device's resources. It also allows the memory management unit 35 still to retrieve the original address used by the external master device 30.

To facilitate this, the internal address space on the internal bus 37 is larger than the address space available through the host communications bus 32. For example, if a 32-bit address space is available to the master device via the communications bus 32, and the internal bus 37 has a 64-bit address space, then the bus frontend unit 33 would prepend a 32-bit number to the address of the access from the master device 30 before forwarding it on to the internal bus 37.

In this embodiment, all accesses from "internal" masters on the slave device, including from the bus frontend 33 and CPU 34, are also handled by the memory management unit 35.

In the embodiment shown in FIG. 3, the various functional units that help to handle the access requests and address misses, such as the read and write buffers 40, 41, could still be associated with the memory management unit 35, or they could, for example, alternatively be moved from the memory management unit 35 to the bus frontend unit 33.

In the latter case, handling of access requests in a manner that could or does require the use of the read and write buffers etc., (i.e. "per access" handling of such requests as discussed as above) would only be possible for access requests that pass via the bus frontend unit 33 (i.e. in the embodiment shown in FIG. 3, access requests from the external master device 30), and not from any master devices, such as those internal to the slave device 31, that may communicate directly with the memory management unit 35 via the slave device internal bus 37 and not via the bus frontend unit 33.

The slave devices 20, 31 of these embodiments of the present invention are configured with the appropriate mappings of the address pages and software routines to be able to handle access requests that cause address misses by appropriate programming of their controlling processors 24, 34, which programming is carried out by loading appropriate software into the CPU 24, 34 that will then control the slave device to operate accordingly.

The software running on the CPU 24, 34 of the slave device 20, 31 for this purpose will, for example, set for one or more of the resources on the slave device, the address or addresses that can be used by a master device to access that resource or those resources on the slave device. The mappings of address pages are configured so that the resources of the slave device effectively appear at the desired "virtual" addresses as seen from a master device that will access the slave device via the host communications bus 22, 32. The software will also leave out of the mappings of address pages (i.e. leave unmapped to internal slave resource addresses), any virtual addresses for which accesses are to be handled on a "per access" basis (e.g. because the slave device does not have the appropriate (or a compatible) resource), so that when a master device tries to access any of those resources, that causes an address miss so that the CPU 24, 34 can then run its software to handle the access request instead. The software loaded into the CPU 24, 34 for this purpose will also take account of the expected communications protocol to be used over the host bus 22, 32, the resources 25, 36 available on the slave device 20, 31, and the desired relationship between the slave device and any master device accessing it, etc.

The CPU 24, 34 of the slave device 20, 31 can be programmed in this way via a number of different routes. Firstly, the slave devices' CPUs 24, 34 can themselves run an internal program that determines the, e.g. mappings of address pages, to set up, and then stores those mappings for use by the memory management unit 23, 35 of the slave device 20, 31. The CPUs 24, 34 determine the mappings of address pages required by analysing access patterns of the master device and configuring the mappings of address pages accordingly.

The controlling CPUs 24, 34 of the slave devices 20, 31 can also be programmed to configure them in this way by an external (i.e. off-slave) device. The external device could be a master device that is in communication with the slave device 20, 31 via the host bus 22, 32, or any other suitable device that can communicate appropriately with the CPU 24, 34 on the slave device. In this case the slave device's controlling CPU is programmed by the external, e.g., master, device uploading to the slave device appropriate software that will run on the controlling CPU of the slave device, which software will then be executed and install itself on the controlling CPU 24, 34 of the slave device.

Each slave device's CPU 24, 34 also includes firmware that marshals and controls what the programming and software uploaded to the CPU 24, 34 (by a master device or otherwise) can do. This helps to retain the integrity of the slave device, and to counter, for example, any flawed or malicious software that might be uploaded to the slave device's controlling CPU. Techniques such as the use of encryption, digital signatures, and/or the testing of the new code in a virtual sandbox or cage are also used to enhance the security of the process.

The controlling processors 24, 34 of the slave devices 20, 31 can be repeatedly programmed to configure them in this way in use. When a new configuration program is uploaded to the controlling processing unit of the slave device, the new program replaces the whole or part of an or the existing configuration program running on the slave device.

As discussed above, the ability to program the slave device to configure its handling of access requests means that the interface presented by the slave device to a master device can be varied in use, and set to, for example, emulate the interface presented to a master device by an existing slave device. In effect the configuration controlling CPU of the slave device can control the interface the slave device presents to a master device that attempts to access it.

An example of the operation of a slave device arrangement in accordance with the present invention and using such "interface control" will now be described. The following embodiment is given in the context of the slave device being a 3D graphics processing platform configured for use on a modern PC (Personal Computer). However, as will be appreciated by those skilled in the art, other arrangements are possible.

In this embodiment, the slave device is equipped with some firmware, as is known in the art, to initialize it at start-up, which firmware is resident in non-volatile memory on the slave device platform at memory addresses that the internal processor of the slave device will fetch and start executing instruction from at power-up. This firmware operates to, inter alia, test and initialize all the modules on the slave device platform when it is executed on the internal processor of the slave device on power-up.

This firmware also configures a number of bus interfaces for the slave device by programming the controlling processor to configure address mappings, etc., as discussed above. In this embodiment, the firmware sets up three interfaces for the slave device, a "simple" graphics interface, a "complex" graphics interface, and an "interface emulation configuration" interface. These interfaces are explained further below. Other arrangements are, of course, possible. These multiple simultaneous interfaces are arranged such that they do not have any overlapping or conflicting resources with any of the other interfaces.

The simple graphics interface that is set up is such as to make the 3D graphics platform usable on a computer host from start-up without the need for a complex 3D graphics driver.

Where the 3D graphics platform is to be used on an IBM x86 PC system, the "simple" graphics interface is preferably compatible with a basic VGA interface. (As is known in the art, for personal computers the IBM VGA interface is the standard for an initial simple low-level graphics platform interface.) To make the interface so compatible, the firmware on the graphics platform sets up the interface to: present to the host a VGA compatible register level interface, give the host access to memory containing code the host will execute on start-up, and give the host access to memory containing code the host operating system or host applications can execute to control the graphics platform. Other facilities such as linear frame buffer access can also be provided to enhance compatibility.

For computer platforms other than the IBM x86 PC (such as Sun and Apple platforms), the simple graphics interface should be configured correspondingly.

The 3D graphics platform is also configured on set-up to provide a more complex graphics interface. This is desirable because while a simple graphics interface such as the VGA interface can work well for start-up and simple operating systems, such a simple interface would not provide access to the full potential and resources of a modern 3D graphics processing platform.

This more complex interface preferably extends the basic VGA interface with accesses to graphics platform specific resources. It can, for example, be a more complex legacy interface (i.e. a known, existing, more complex 3D graphics interface).

The final interface that is set up at start-up by the firmware is the "interface emulation configuration" interface. This interface is relatively small and simple and arranged out of the way of the other interfaces and is arranged to allow a master device on the host system to program, e.g. to upload the relevant software to, the 3D graphics platform to set an interface presented by the 3D graphics platform in use. This interface emulation configuration interface allows the uploading of a new program to the controlling processor on the 3D graphics processing platform which program could, for example, replace the whole or part of the current interface configuration software running on the processor.

This interface is configured by the firmware for a pre-defined communications protocol via which the master will program the slave device. The master device on the host system will also require any necessary software to allow it to communicate with the 3D graphics processing platform using this communications protocol. Such software can be added to the master device as desired, e.g. by loading it with the appropriate software.

To set an interface presented by the 3D graphics processing platform via the Interface Emulation Configuration Interface, the master device on the host system will upload software capable of running on the internal processor of the 3D graphics platform to the graphics platform over the interface emulation configuration interface. The uploaded software will then be executed on the 3D graphics processing platform and install itself as a new interface (for example a new complex interface) much like the start-up initialization done by the firmware.

The firmware on the 3D graphics processing platform is arranged to marshal what any uploaded software is allowed to do. This helps to retain the 3D graphics processing platform's integrity and reduce the risk of fraudulent or malicious software uploaded to the 3D graphics processing platform causing problems.

The 3D graphics processing platform also implements techniques to try to ensure that the new program is safe to run. This could be done using techniques such as, for example, cryptography, digital signatures and/or testing the code in a virtual sandbox or cage.

Where the interface presented by the 3D graphics processing platform is being customised in this way, it would also, for example, be possible to add authentication and encryption across the interface to, for example, ensure that the master device accessing the 3D graphics processing platform has the credentials to do so and to secure any data that is transferred and stored.

In this embodiment, as well as a master device being able to upload new interface software to the 3D graphics processing platform, a master device can also extend the interface software with graphics handling routines normally executed on the master device by uploading those routines to the 3D graphics processing platform via the interface emulation configuration interface. This would allow, for example, the 3D graphics processing platform to carry out some of the work that must be done between the point where the data for the 3D graphics processing operation enters the master device driver software through the Applications Programming Interface and the point where data is fed to the hardware resources on the 3D graphics processing platform.

For example, all the 3D graphics processing and handling routines could be transferred to the 3D graphics platform with the master device driver software then being stripped down to contain only the necessary interface emulation configuration interface handling routines and a simple tunnel interface, such that all calls from host applications to the Applications Programming Interface are then forwarded to the 3D graphics processing platform more or less in their raw form, with the 3D graphics processing platform then doing all the 3D graphics processing.

FIGS. 4A and 4B show an example of such an arrangement.

FIG. 4A shows the typical division of graphics processing functions between a host system 40 and the slave graphics processor 41 in existing 3D graphics enabled systems.

In such an arrangement, the host system runs an application 42 that when it requires 3D graphics operations sends a 3D graphics API call. The host system 40 includes a program 43 that recognises the 3D graphics API calls from the application 42. Those calls are then translated in the host system to hardware specific calls tailored for the graphics processing platform 41 by an appropriate program 44 and finally are adapted to the communications bus standard linking the host and graphics processing platform by a suitable program 45. The hardware specific calls are then transmitted to the graphics processing platform 41. The graphics processing platform receives the hardware specific calls and runs a program 46 to unpack the data. It then carries out its various 3D graphics processing functions 47 and displays the graphics on a monitor 48.

FIG. 4B shows an alternative arrangement that would be possible in accordance with this preferred embodiment of the present invention in which a master device on the host system has uploaded graphics handling routines to the slave 3D graphics processing platform and in particular a program 44 for translating 3D graphics API calls to hardware-specific commands for the graphics processing platform's functional units (which can then be processed as before by the 3D graphics processing platform), so that the graphics processing platform can accept raw 3D graphics API calls and act upon them. The host system 40 accordingly still runs applications 42 requiring 3D graphics operations and includes means 43 for recognising API calls from those applications. However, the host system 40 simply recognises the API calls and then passes those calls directly to the graphics processing platform 41 without further acting upon them (other than to adapt the API calls to the physical bus standard 45). The API calls are then translated to hardware-specific commands for the graphics processing platform's functional units locally on the graphics processing platform 41.

Thus, in this arrangement, rather than the host system 40 acting on the API calls and translating them to appropriate hardware-specific calls for the graphics processing platform, the host simply passes the API calls straight to the graphics processing platform which then itself translates those API calls to hardware-specific calls. This offloads (transfers) graphics processing functions from the host system 40 to the graphics processing platform 41.

When the 3D graphics processing platform configures and presents plural interfaces to a master device, the master device and 3D graphics processing platform may communicate via different protocols across each interface. One interface and protocol could, for example, allow forwarding of data straight to the 3D processing platform slave device resources (since those resources would directly be able to understand their format), while another interface and protocol may have formats unreadable to the internal slave resources of the 3D graphics processing platform, thereby demanding more management by the internal processor or processors on the 3D graphics processing platform.

It can be seen that in this embodiment, the 3D graphics processing platform will initially (at least) present a low-level, legacy simple interface plus an interface to change the interface it presents to a master device. The low-level simple interface gives the master and slave platforms a smallest common denominator over which to communicate. If the master device later wants to change the interface to something more powerful or complex, it can upload appropriate software to do so using the interface emulation configuration interface such that then both the master device and the slave 3D graphics processing platform have a matched set of software which can then communicate with each other across the interface. As the parts of the matched set of software (i.e. the part which is designated and transferred to the slave 3D graphics processing platform and the other part which the master device runs on its processor) are matched, each part of the software will know the communications protocol and what to expect from the other part across the interface.

It should be noted that the slave device can itself (and usually will) have bus mastering abilities. Thus, the slave device platform may on its own be able to access other resources available over the host bus, like the host memory, without going via the host processor.

The invention claimed is:

1. A method, comprising:
    receiving at a first device an authentication request from a second device;
    providing authentication of the second device by the first device based on the received authentication request, wherein the authentication is provided by the first device validating credentials of the second device;
    configuring the first device to be controlled by the authenticated second device;
    allowing the authenticated second device to control resources of the first device; and
    receiving at the first device an access request from the authenticated second device;
    wherein the resources of the first device are used and/or controlled by the authenticated second device based on the access request;
    wherein the first device handles the access request on a per access basis;
    wherein handling the access request on a per access basis provides the first device with control over an interface the first device presents to the authenticated second device.

2. The method of claim 1, wherein the access request comprises at least one of a read request and a write request.

3. The method of claim 2, wherein at least one of the read request and the write request is encrypted to enhance security.

4. The method of claim 2, wherein the write request includes at least a value to be written to the resource of the first device.

5. The method of claim 1, wherein the first device:
    interprets the access request; and
    generates a response to the access request.

6. The method of claim 5, wherein the first device interprets the access request in a predefined format, wherein the access request comprises commands and/or data.

7. The method of claim 5, wherein the first device interprets the access request having different formats, wherein the access request comprises commands and/or data.

8. The method of claim 5, wherein the access request comprises commands and/or data and the generated response to the access request comprises carrying out one or more functions related to the commands and/or data.

9. The method of claim 5, wherein the access request comprises a read request and during the read request, the first device sends data associated with the access request to an accessing device.

10. The method of claim 5, wherein the access request comprises a write request and during the write request, the first device retrieves data from the access request and stores the retrieved data.

11. The method of claim 1, wherein the first device analyzes the access request to determine one or more required resources.

12. The method of claim 11, wherein the one or more required resources comprise one or more memory units, one or more processors, one or more registers, and/or one or more buffers.

13. The method of claim 1, wherein the first device is configured to present one or more interfaces to the second device and/or another external device.

14. The method of claim 13, wherein the first device is configured to communicate via different protocols across the one or more interfaces.

15. The method of claim 1, wherein the interface presented by the first device to the second device is varied in use.

16. The method of claim 1, wherein the interface presented by the first device to the second device is varied in use by the first device.

17. A non-transitory computer-readable medium having stored thereon a plurality of computer-executable instructions which, when executed by a computer, cause the computer to:
    receive at a first device an authentication request from a second device;
    authenticate the second device by the first device based on the received authentication request, wherein authentication is provided by the first device validating credentials of the second device;
    configure the first device to be controlled by the authenticated second device;
    allow the authenticated second device to control resources of the first device; and
    receive at the first device an access request from the authenticated second device;
    wherein the resources of the first device are used and/or controlled by the authenticated second device based on the access request;
    wherein the first device handles the access request on a per access basis;
    wherein handling the access request on a per access basis provides the first device with control over an interface the first device presents to the authenticated second device.

18. The non-transitory computer-readable medium of claim 17, wherein the first device analyzes the access request to determine one or more required resources.

19. The non-transitory computer-readable medium of claim 17, wherein the interface presented by the first device to the second device is varied in use.

20. The non-transitory computer-readable medium of claim 17, wherein the interface presented by the first device to the second device is varied in use by the first device.

21. A method, comprising:
sending an authentication request from a first device to a second device;
configuring the first device to control the second device after the first device is authenticated by the second device, wherein:
authentication is provided by second device, and
the first device is authenticated by the second device by validation of credentials of the first device by the second device;
controlling resources of the second device by the authenticated first device; and
sending an access request from the authenticated first device to the second device;
wherein the resources of the second device are used and/or controlled by the authenticated first device based on the access request;
wherein the access request is handled by the second device on a per access basis;
wherein handling the access request on a per access basis provides the second device with control over an interface presented by the second device to the authenticated first device.

22. The method of claim 21, wherein the interface presented by the second device to the first device is varied in use.

23. The method of claim 21, wherein the interface presented by the second device to the first device is varied in use by the second device.

* * * * *